United States Patent Office
3,429,989
Patented Feb. 25, 1969

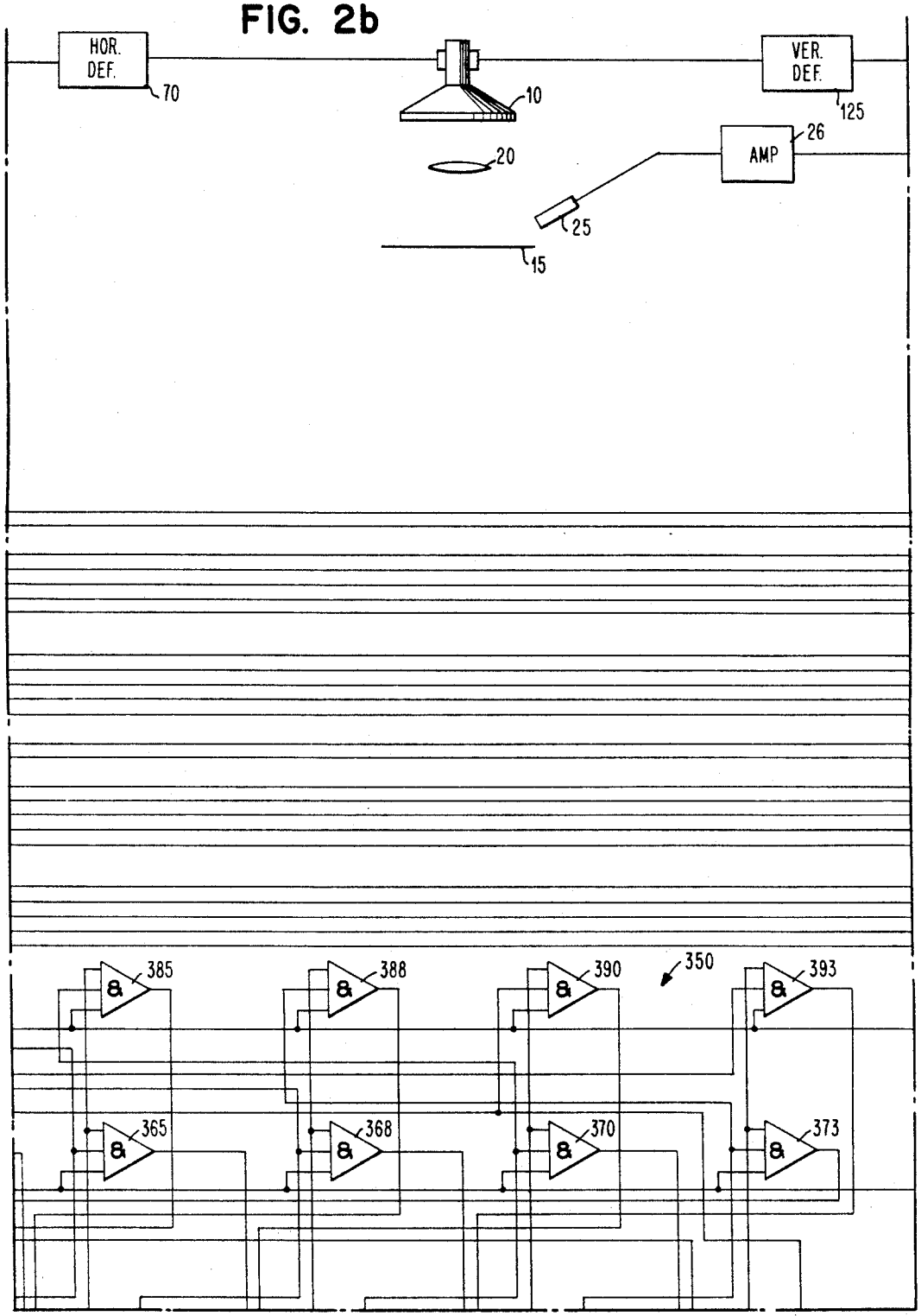

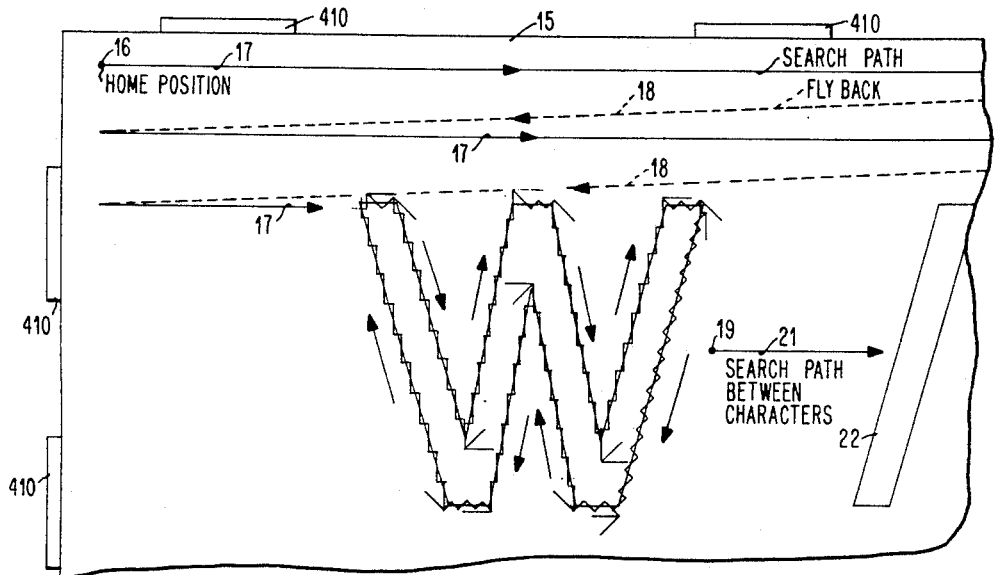
FIG. 5
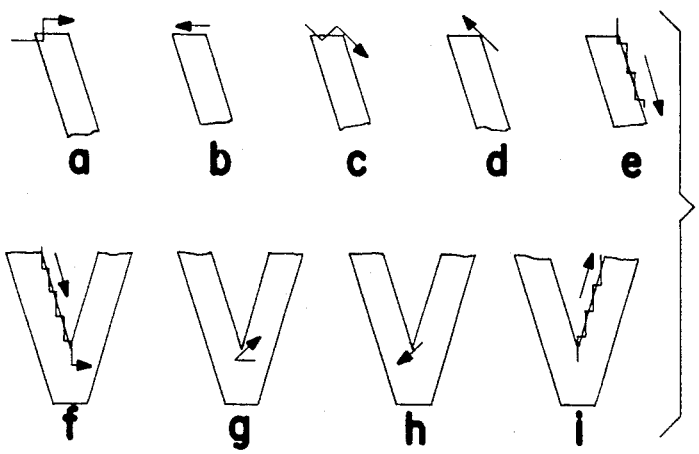
FIG. 6
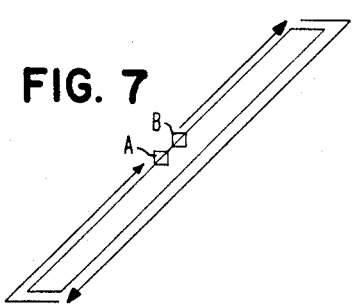
FIG. 7
| FIG. 2a | FIG. 2b | FIG. 2c |
| --- | --- | --- |
| FIG. 2d | FIG. 2e | FIG. 2f |
FIG. 3

3,429,989
ELECTRONIC CURVE FOLLOWER
Norman S. Stockdale, Rochester, Minn., assignor to International Business Machines Corporation, New York, N.Y., a corporation of New York
Filed June 4, 1964, Ser. No. 372,497
U.S. Cl. 178—6.8
Int. Cl. H04n 3/00; G01j 1/20; G05b 1/00
9 Claims

ABSTRACT OF THE DISCLOSURE

An electronic curve follower is provided which utilizes the beam of a cathode ray tube for following a curve. The beam is under control of a direction ring which provides input controls to deflection selection logic. The latter controls the horizontal and vertical deflection circuits of the cathode ray tube. The direction ring is bi-directional and it operates under control of ring control logic circuitry. The ring control logic circuitry receives inputs from timing control circuits. The timing control circuit provides indications as to when the beam has made a transition from black to white and vice versa and when the beam has been too long in the background area or in the curve area.

---

This invention relates to an electronic curve follower and more particularly to an electronic curve follower for following the edge of a curve and still more particularly, to an electronic curve follower for following the edge of convoluted curves.

While the invention can be utilized for a variety of purposes where it is desired to follow curves, it finds particular utility in character recognition apparatus. Of course, it can also be used for controlling the movements of automatic machine tools, such as a jig bore and it can also be used in facsimile communication systems. While this invention is limited to curve following, format control is included for the purpose of better appreciating the invention's utility. The particular format control can be applied in connection with any type of curve to be followed.

The art of electronic curve following is becoming highly developed. Some electronic curve followers follow the edge of convoluted curves as in the present invention, others are able to follow the edge of unconvoluted curves, such as photo formers, while still others follow a curve by intercepting the curve and can be defined as line followers.

The prior art curve followers having the capability for following the edge of convoluted curves control the beam of a cathode ray tube so that it will follow the edge of a curve by looping in small circular arcs or rectangles along the edge of the curve being followed.

This invention also utilizes the beam of a cathode ray tube for following a curve; however, the control over the beam is entirely different. In this invention, the beam does not loop back upon itself and hence, the beam can be advanced along the edge of the curve at a faster rate. Further, since the beam does not loop out away from the curve, there is less chance of accidental beam transfer onto neighboring curves. The beam's excursions from the background area into the curve and vice-versa are variable, depending upon whether the beam has made a transition from the background area into the curve, or whether the beam has spent too much time in either the background area or in the curve area. This arrangement also permits the beam to be advanced at a faster rate than those systems where the beam moves a predetermined fixed increment each time.

In this invention, system inertia is minimized because the information relating to the beam position and heading or direction is available instantaneously. The deflection circuits of this invention are more amenable to accurate integration than where the beam is caused to loop back upon itself.

This is because the integration can be performed by switching positive and negative current sources to a capacitor store instead of by a capacitor feed-back amplifier.

In this invention, the beam moves under the control of a direction ring which in turn provides an input to the logic circuits for controlling the deflection circuits of the cathode ray tube. The direction ring is a bi-directional ring and it is under the control of ring control logic which has inputs from the direction ring itself and inputs from timing control circuitry. The timing control circuitry provides an indication when the beam has been too long in the background area or in the curve area. The direction ring controls the direction in which the beam will move. The direction ring consists of eight stages which correspond to eight compass directions, i.e. east, northeast, north, northwest, west, southwest, south and southeast. In order for the beam to follow clockwise a curve heading in the northeast direction, the beam is caused to move in an east direction when in the background area and in a north direction when in the curve area. Hence the direction ring would remain with the northeast stage thereof set so long as the curve heads in a northeast direction and the beam continues to travel east when in the background area and north when in the curve area. However, if the beam, while traveling either east or north, spends too much time in either direction without making a transition, i.e., from the background area into the curve area, and vice versa, time out circuits are provided whereby the beam is caused to retrace its excursion back to the point of origin with respect to the direction it was taking when it timed out. The ring is then shifted whereby another stage of the ring becomes active so as to facilitate the following of the curve according to its new heading. This is accomplished by the ring control logic. In this manner, the beam is caused to follow the contour of a curve at the edge thereof. The directional information for causing the beam to follow the contour of the curve can be used to identify the curve being followed or it can be used to reproduce the curve for any purpose so desired.

Accordingly, a principal object of this invention is to provide an improved electronic curve follower for following along the edge of curves.

Another very important object of the invention is to provide an improved electronic curve follower which incorporates a cathode ray tube and the beam thereof follows the contour of the curve along the edge thereof according to information relating to beam position and heading.

Still another object of the invention is to provide an electronic curve follower incorporating a cathode ray tube which controls the beam thereof to move in variable increments depending upon whether the beam has moved from the background area into the curve area and vice versa.

Yet another object of the invention is to provide an electronic curve follower which incorporates a cathode ray tube and the beam thereof is so controlled that if a transition from background area to curve area is not made within a predetermined period of time, the beam is returned to its original position for that particular excursion and is then caused to be moved in a new predetermined direction, this process is repeated until a transition is achieved.

The foregoing and other objects, features and advantages of the invention will be apparent from the following more particular description of preferred embodiments of the invention, as illustrated in the accompanying drawings.
In the drawings:

FIG. 1 is a schematic block diagram of the invention with format control included;

FIGS. 2a, 2b, 2c, 2d, 2e and 2f arranged as in FIG. 3 are a schematic circuit diagram of one embodiment of the invention;

FIG. 3 is a diagram showing how FIGS. 2a, 2b, 2c, 2d. 2e and 2f are arranged;

FIGS. 4a, 4b and 4c with FIG. 4b disposed to the right of FIG. 4a and FIG. 4c disposed to the right of FIG. 4b, taken together are a schematic circuit diagram of the invention embodied with a particular detailed format control;

FIG. 5 is a diagram illustrating the beam path of the cathode ray tube scanner during search and follow routines;

FIGS. 6a, 6b, 6c, 6d, 6e, 6f, 6g, 6h and 6i are a series of diagrams illustrating beam direction changes during a follow routine; and, FIG. 7 is a diagram illustrating a way for determining when a follow routine has been completed.

Figure 1:
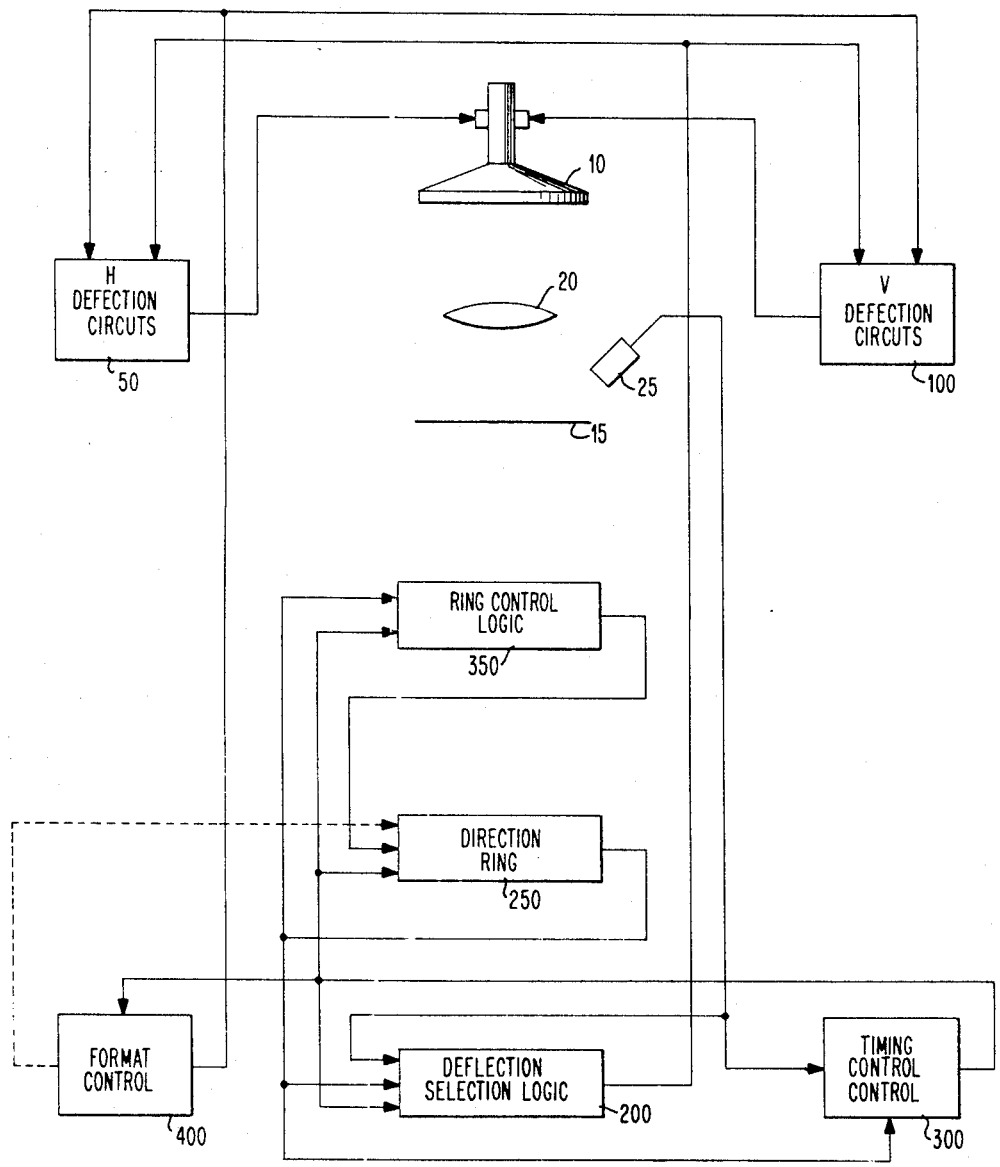
Figure 2A:
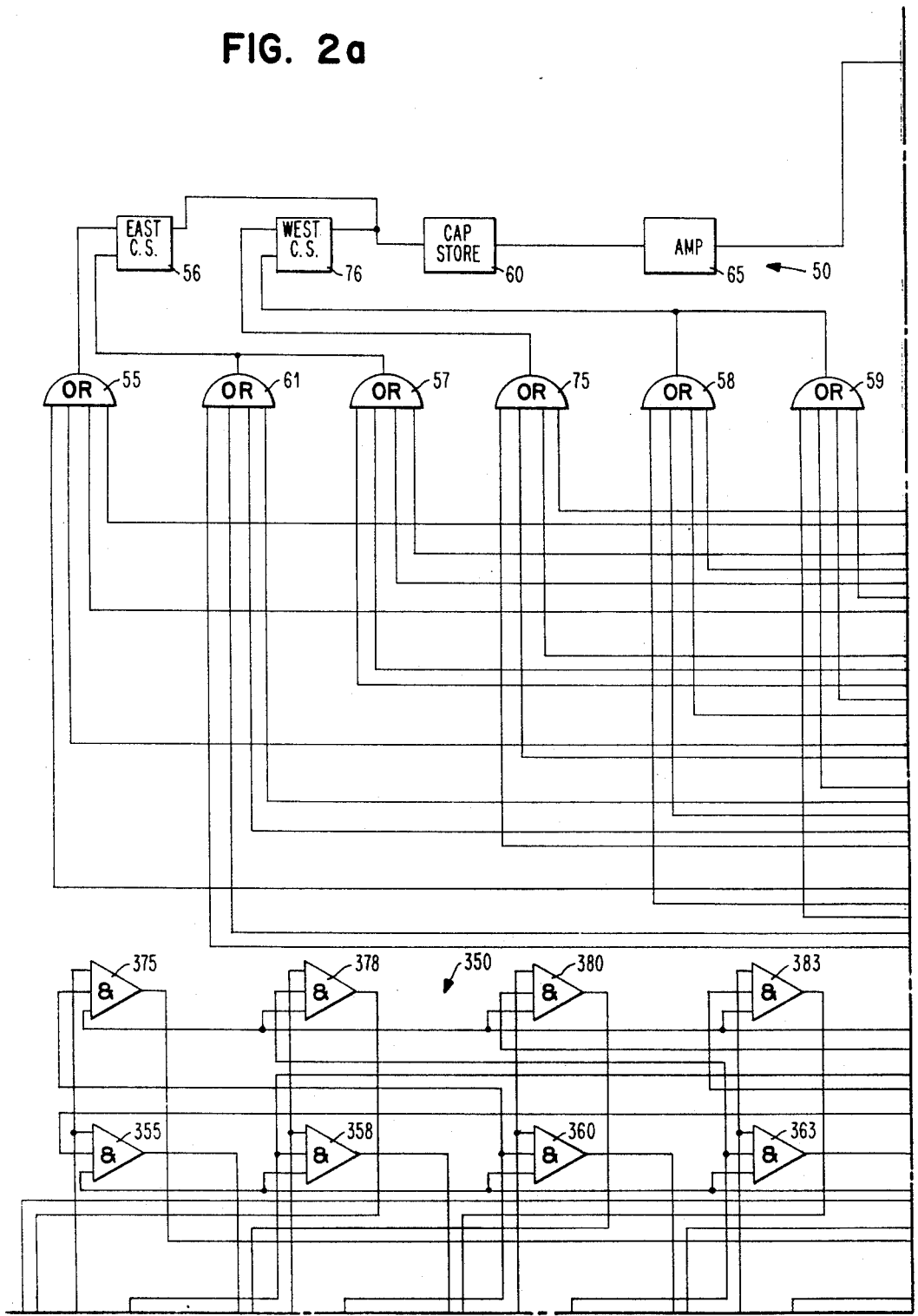
Figure 2C:
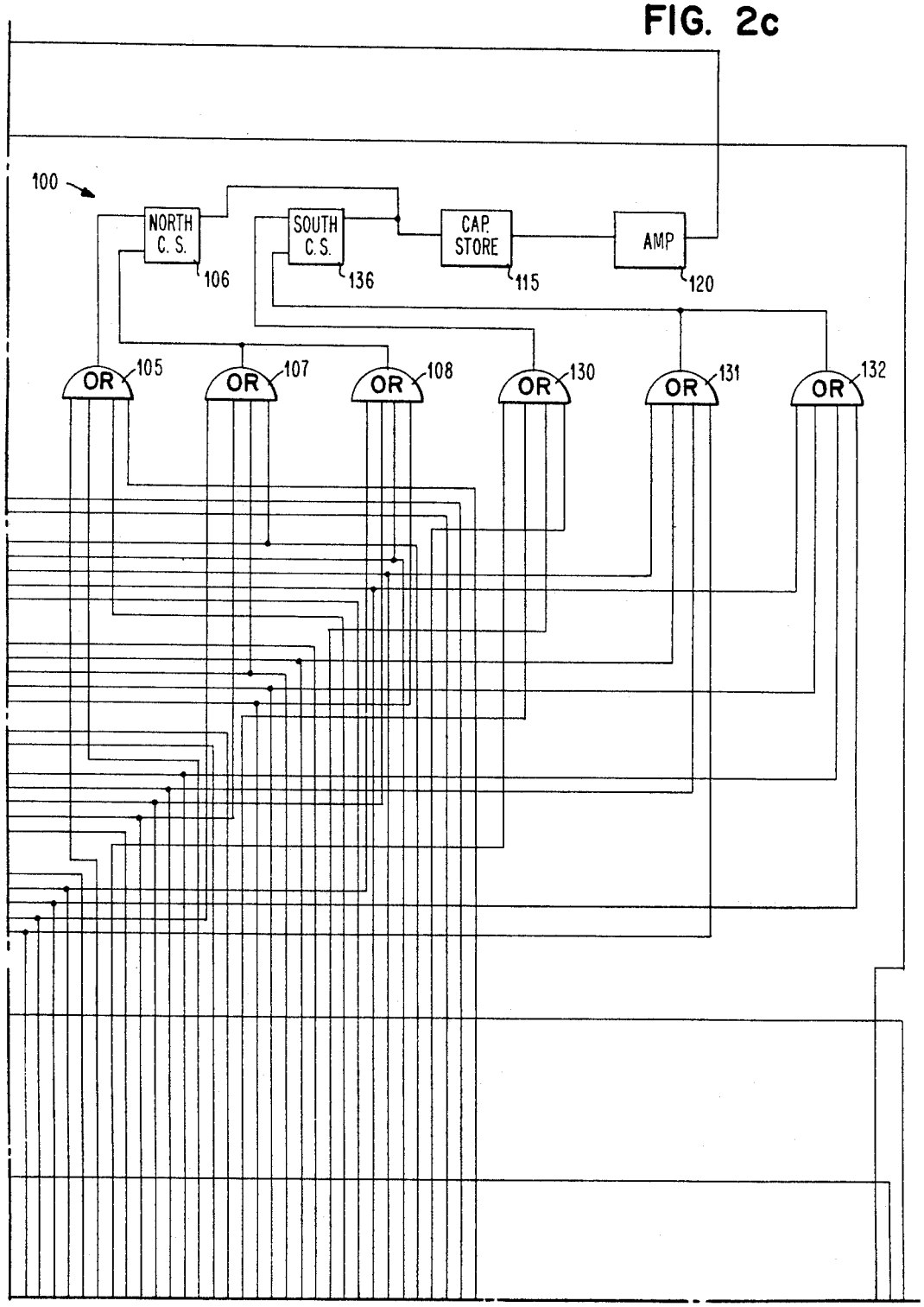
Figure 2D:
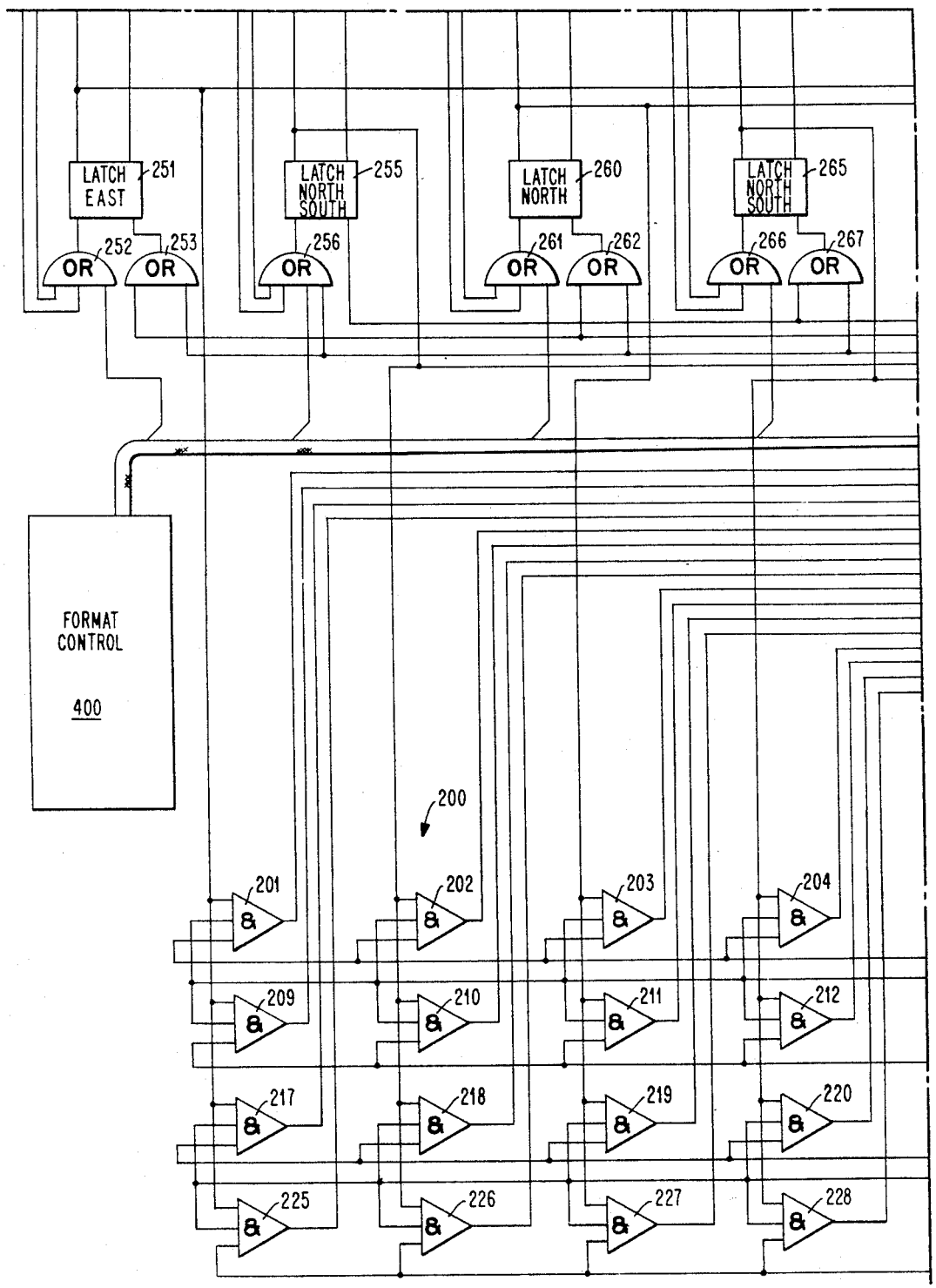
Figure 2E:
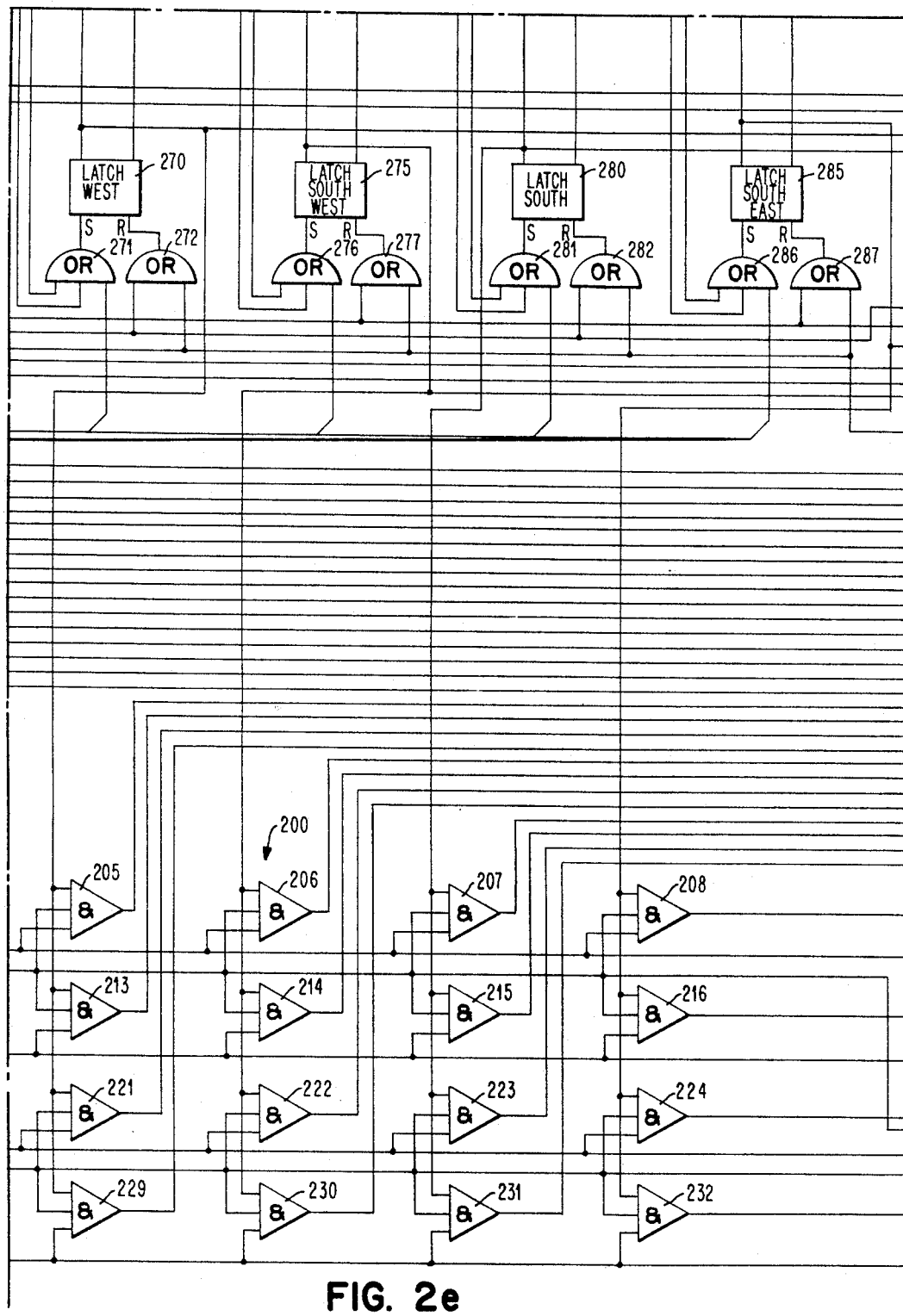
Figure 2F:
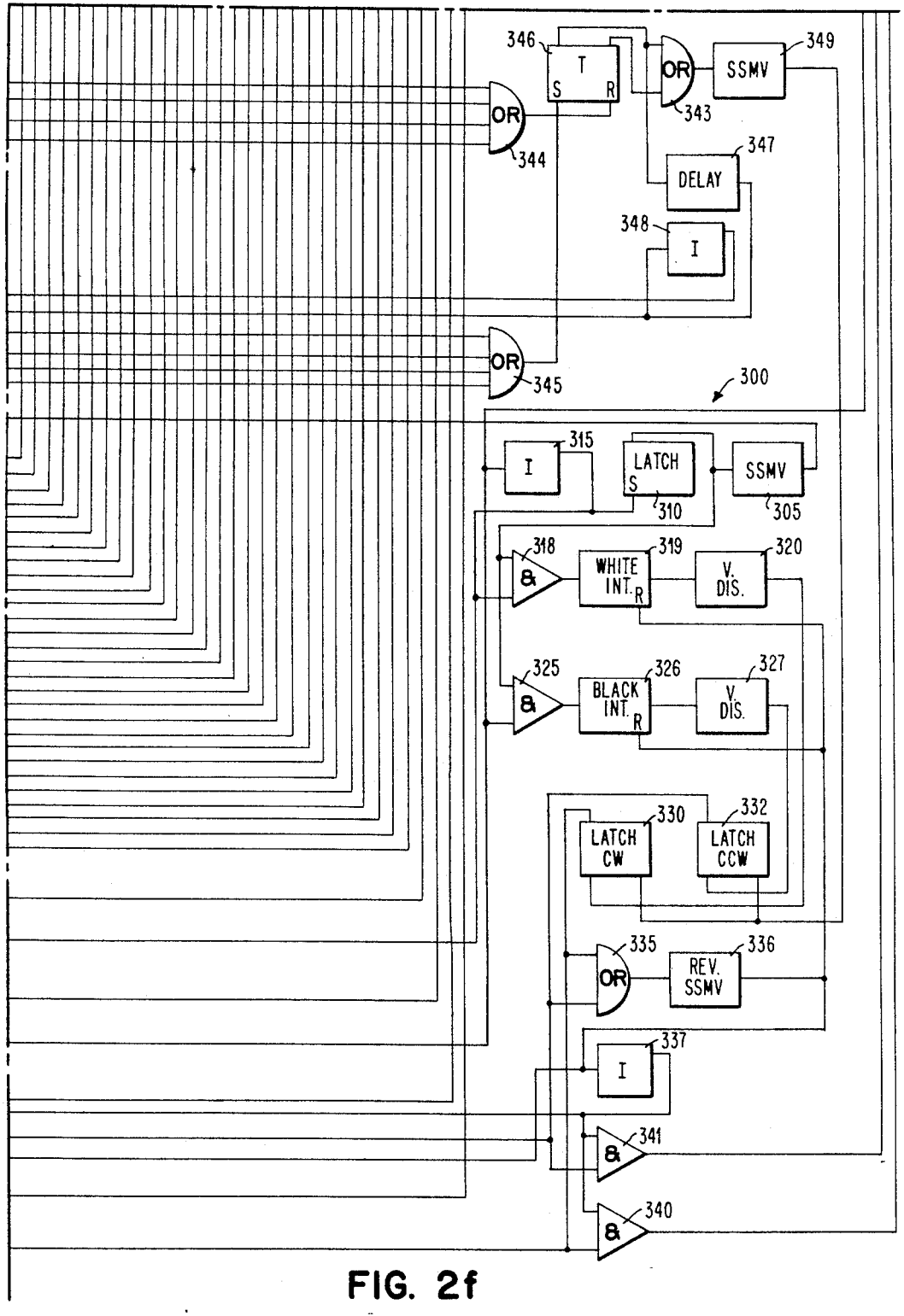

With reference to the drawings, and particularly to FIG. 1, the invention is illustrated by way of example as including a cathode ray tube 10 as a scanner for scanning the curve contained upon a sheet of paper 15. The cathode ray tube 10 is illustrated schematically only; however, it includes all the elements of a conventional cathode ray tube such as a cathode, grid and deflection plates. The deflection system imparts vertical and horizontal components of motion to the electron beam in the cathode ray tube 10. The electron beam appears as a spot of light on the face of the cathode ray tube 10 as it strikes the phosphor screen thereof. The spot of light hereinafter referred to as the beam is focused by means of a lens 20 onto the paper or document 15. The invention is equally suitable to a deflection system of the electrostatic type or the magnetic type.

A photomultiplier tube 25 is positioned at an angle with respect to the paper 15 and upon the same side of the paper 15 as the cathode ray tube 10 so as to view the paper 15 and detect the reflected light from paper 15 due to the beam impinging upon paper 15. It should be understood that the invention is equally suitable to a system where a photomultiplier tube or other light sensitive device is positioned on the opposite side of the paper 15 so as to detect the light transmitted by the paper 15.

The amount of light transmitted or reflected by paper 15 in the background area is different from the amount of light transmitted or reflected in the curve area. Hence, the signal developed by the photomultiplier 25 when the beam is in the background area will beat one level and at another level when the beam is in the curve area. Hereinafter, the background area will be referred to as a "white" area and the curve area will be referred to as a "black" area. These terms are arbitrary and are not intended to limit the invention; however, they facilitate the explanation of the invention. Additionally, when the beam is in black, the output of the photomultiplier tube 25 is at an up level and when in white, the output is at a down level. These designations are also arbitrary and could be reversed without affecting the scope of the invention.

The position of the beam is controlled by horizontal and vertical deflection circuits 50 and 100 respectively. In FIG. 1, the horizontal and vertical deflection circuits 50 and 100 are shown as blocks which include current sources for developing the deflection voltages. As will be seen later herein, the current sources will be shown separately from the deflection circuitry. The deflection circuitry is operated under control of a deflection selection logic unit 200 and a format control unit 400. The deflection circuit selection logic unit 200 controls the horizontal and vertical deflection circuits 50 and 100 when the electronic curve follower is in a follow mode and the format control unit 400 controls the deflection circuits when a search is being made for the curve to be followed.

The deflection circuit selection logic unit 200 develops its controls in response to an input from the photomultiplier tube 25, an input from an eight position bi-directional direction ring 250 and an input from a timing control unit 300. The direction ring 250 is under control of the timing control 300 and a ring control logic unit 350. The format control 400 can directly operate deflection circuits 50 and 100 or it can operate circuits through the direction ring 250. The ring control logic unit 350 is controlled by both the direction ring 250 and the timing control unit 300. The timing control unit 300 has an input from the photomultiplier tube 25 and from direction ring 250.

The details concerning the deflection selection logic 200, the direction ring 250, the timing control circuit 300 and the ring control logic 350 are shown in FIG. 2. The direction ring 250 is an eight position latch ring with the eight positions representative of east, northeast, north, northwest, west, southwest, south and southeast directions respectively. Before describing the connections of the latches making up the direction ring 250 with the deflection selection logic 200 and with the ring control logic 350, the function of each latch position of the direction ring 250 will be described.

With the east latch 251 set and when in the clockwise mode, the beam of the cathode ray tube 10 will move in a northeast direction when in black and a southeast direction when in white. The opposite directional movement takes place when the east latch 251 is set and the beam is following a curve in a counterclock-wise mode. It should also be noted that for some curves the clock-wise mode for following on the outside of a curve is the same as the counter-clock-wise mode when following on the inside of a curve and vice versa. In the counter-clock-wise mode, the beam moves in a northeast direction when in white and in a southeast direction when in black. Similarly, when the northeast latch 255 is set and the beam is following the curve in a clock-wise mode, the beam will travel east when in white and north in black, so as to tack along the edge of a curve which is heading in a northeast direction. When in the counter-clock-wise mode, the beam will move north when in white and east when in black so as to also tack along the edge of a curve in a northeast direction.

When the north latch 260 is set, the beam moves in a northeast direction when in white and in a northwest direction when in black to follow clock-wise a curve heading in the north direction. On the other hand, when the north latch 260 is set and the beam is following in a counter-clock-wise mode, it moves in a northwest direction when in white and in a northeast direction when in black so as to follow the curve heading in a north direction.

In order to follow a curve heading in a northwest direction, the northwest latch 265 is set and with this latch set, the beam moves north when in white and west when in black as the beam is moving in a clock-wise mode. However, when in a counter-clock-wise mode, the beam moves west in white and north in black.

When the west latch 270 is set and the beam is moving in a clock-wise mode, the beam moves in a northwest direction when in white and in a southwest direction when in black so as to tack along the curve in a west direction. However, when in a counter-clock-wise mode, the beam moves in a southwest direction when in white and in a northwest direction when in black to follow the curve in a west direction.

With the southwest latch 275 set, the beam moves in a west direction when in white and in a south direction when in black so as to follow a curve in a southwest direction as the beam follows in a clock-wise mode. When the beam is following in a southwest direction in a counter-clock-wise mode, the beam moves south when in white and west when in black.

In order to follow a curve in a southerly direction, the south latch 280 is set and the beam moves in a southwest direction when in white and in a southeast direction when in black when operating in a clock-wise mode so as to follow the curve south. When in the counter-clockwise mode, the beam moves southeast in white and southwest in black so as to follow the curve which is heading south.

The southeast latch 285 controls the movement of the beam so as to follow a curve heading southeast. Under this condition, when in the clock-wise mode, the beam moves south when in white and east when in black so as to follow the curve in a southeast direction. However, when in a counter-clock-wise mode, the beam moves east when in white and south when in black so as to follow the curve in the southeast direction.

The latches 251, 255, 260, 265, 270, 275, 280, 285 of direction ring 250 have a set input connected to the output of logical OR circuits 252, 256, 261, 266, 271, 276, 281 and 286 respectively. The reset inputs to these latches, except for latch 255, are connected to the outputs of logical OR circuits 253, 262, 267, 272, 277, 282 and 287 respectively. The reset input of northeast latch 55 is directly connected to the output of delay 347. Each of the OR circuits 252, 256, 261, 266, 271, 276, 281 and 286 have an input for setting the associated latch when in the search mode. These inputs to the logical OR circuits are connected to the format control unit 400. In this instance, the format control unit 400 does not drive the deflection circuits 50 and 100 of FIG. 1 directly. Rather, the format control unit provides inputs to the direction ring 250 so as to operate the deflection circuits 50 and 100 by means of the deflection selection logic 200. The format control unit 400 in this instance can merely be a set of switches which are selectively operable for initiating a search operation for finding a curve to be followed by the beam of the cathode ray tube 10. In this example, it will be assumed that the switches of the format control unit 400 guide the search for the curve from west to east to end the search on the western boundary of a curve.

When the curve is first engaged by the beam of the cathode ray tube 10, the northeast latch 255 will automatically be set. This is accomplished via the logical OR circuit 256 which also has an input connected to the output of an initial set singleshot multivibrator 305 which is included within the timing control circuit 300. The initial set singleshot multivibrator 305 has its input connected to the set output of a follow latch 310. In this particular example, when the beam of the cathode ray tube is in black, the output from the photomultiplier tube 25 is considered to be at an up level and it is considered to be at down level when in white. Further, the follow latch 310 and the latches forming the direction ring 250 are set by a down level signal. Hence, the set input of the follow latch 310 is connected to the output of an inverter 315 which has its input connected to the output of a video amplifier 26. The video amplifier 26 has its input connected to the output of the photomultiplier tube 25.

It is thus seen by this particular arrangement the beam can search for the curve in any of eight directions under control of format control 400 and when the beam engages the curve in a search mode, a signal will be developed by the photomultiplier tube 25 and amplified by the amplifier 26 and transmitted via the inverter 315 to set the follow latch 310. With the follow latch 310 set, the operation is switched from the search mode to the follow mode. Additionally, the northeast latch 255 will be set by the pulse developed by the initial set singleshot multivibrator 305. The pulse so developed by the singleshot multivibrator 305 is a negative going pulse and it sets the northeast latch via the logical OR circuit 256.

The output of the singleshot multivibrator 305 is also connected to inputs of logical OR circuits 253, 262, 267, 272, 277, 282, and 287 and hence, when the singleshot multivibrator 305 develops an impulse, it resets the east latch 251, the north latch 260, the northwest latch 265, the west latch 270, the southwest latch 275, the south latch 280 and the southeast latch 285.

The set output of the northeast latch 255 is connected as an input to logical AND circuits 202, 210, 218, and 226, which are part of the deflection selection logic 200. However, while the set output of the northeast latch 255 is conditioning the logical AND circuits 202, 210, 218 and 226, only the output of logical AND circuit 210 will pass a signal because it is the only logical AND circuit which has all of its inputs satisfied at this particular time.

In addition to the input from the northeast latch 255, the logical AND circuit 202 also has an input connected to the output of the inverter 315 of the timing control circuits 300 which provides a signal indicating that the beam is not in black and an input connected to the output of an inverter 337 which has its input connected to the output of a reverse singleshot multivibrator 336. The reverse singleshot multivibrator 336 functions to provide an indication that the excursion of the beam has either been too long in black or too long in white, and that the beam should be returned to its starting position. Since the beam is not in white at this time, there will be no output from the logical AND circuit 202. As it will be seen later herein, the output from logical AND circuit 202 is to drive the beam east effectively.

The logical AND circuit 210 in addition to the input from the northeast latch 255 also has an input connected to the output of the video amplifier 26 and an input connected to the output of the inverter 337. The input from video amplifier 26 is to provide indication when the beam is in black. The input from inverter 337 provides an indication that the beam has not been too long in black. There will be an output from the logical AND circuit 210 at this time because the northeast latch 255 is set, the beam is in black and the reverse singleshot multivibrator 336 has not been fired, which is indicative that the beam has not been too long in black. The output from logical AND circuit 210, as it will be seen later herein, causes the beam to be driven north.

The reverse singleshot multivibrator 336 has its input connected to the output of a logical OR circuit 335, which has an input connected to the set output of a clock-wise latch 330 and an input connected to the set output of a counter-clock-wise latch 332. The clock-wise latch 330 functions to provide an indication when the beam of the cathode ray tube 10 has remained too long in white and the counter-clock-wise latch 332 functions to provide an indication when the beam remains too long in black.

The video output from video amplifier 26, when passed through inverter 315, provides an indication when the beam is in white and the output of inverter 315 is connected to one input of a logical AND circuit 318. The other input to the logical AND circuit 318 is connected to the set output of the follow latch 310. Hence, when in the follow mode, the video output indicating that the beam is white, is transmitted to a white integrator 319 which has its input connected to the output of logical AND circuit 318. The output of the white integrator 319 is connected to the input of a voltage discriminator 320. The output of the discriminator 320 is connected to the set terminal of the clock-wise latch 330. By this arrangement, when the beam has an excursion in white, the integrator 319 generates a ramp type voltage and if this voltage exceeds a predetermined level, an output is developed by the discriminator 320 and the clock-wise latch 330 is set thereby. Of course, the integrator 319 will not develop a voltage exceeding the predetermined level if the beam does not remain too long in white. The integrator 319 has its reset terminal connected to the output of the reverse singleshot multivibrator 336.

In order to determine whether the beam has remained in black too long, the output of the video amplifier 26 is directly connected to an input of the logical AND circuit 325 which has another input connected to the set output of the follow latch 310. The output of the logical AND circuit 325 is connected to the input of a black integrator 326. The output of the integrator 326 is connected to the input of a voltage discriminator 327 which has its output connected to the set terminal of the counter-clock-wise latch 332. The integrator 326 also develops a ramp type voltage and if this voltage exceeds a predetermined level, it is indicative that the beam has remained too long in black and the discriminator 327 develops an output signal for setting the counter-clock-wise latch 332. The integrator 326 is also reset by the reverse singleshot multivibrator 336.

It will be recalled that the logical AND circuit 218 also has an input connected to the set output of the northeast latch 255; however, it will not be conditioned at this time because it has another input connected to the output of the reverse singleshot multivibrator 336 which is not fired at this time. The logical AND circuit 218 also has an input connected to the output of the counter-clockwise latch 332 which also is not set at this time. The function of logical AND circuit 218 as it will be seen later herein causes the beam to move south and thereby return to its point of origin if it times out in black during a particular excursion.

Logical AND circuit 226 has one input connected to the set output of the northeast latch, another input connected to the output of the reverse singleshot multivibrator 336 and an input connected to the set output of the clockwise latch 330. It is thus seen that there will not be an output signal at the output of logical AND circuit 226 at this time. Logical AND circuit 226 functions to cause the beam to move west so as to return to its point of origin if it times out in white during a particular excursion.

The output of logical AND circuit 202 is connected to an input of a logical OR circuit 55 which has its output connected to an input of an east current source 56 which consists of several individual current sources. Each current source is of the type well known in the art, and while not shown, it would include a transistor having its base connected to the output of the logical OR circuit 55, its collector connected to one side of a capacitor and the emitter is connected to a suitable voltage through a resistor. In this example, the output of the current source 56 is shown as being connected to the input of a capacitor store 60. The capacitor store 60 also is not shown in detail, but it would include a capacitor which is connected to the collectors of the transistors forming the current source 56. The capacitor store 60 is also connected to a high input impedance amplifier 65 which has its output connected to the input of the horizontal deflection circuit 70. The horizontal deflection circuits 70 are of the type well known in the art, for deflecting the beam of the cathode ray tube 10 in a horizontal direction.

The output of logical AND circuit 226 also functions to effect deflection of the beam in a horizontal direction but opposite to the direction effected by logical AND circuit 202. The output of logical AND circuit 202 effects a deflection in the east direction while the output of the logical AND circuit 226 effects a deflection in the west direction. The output of logical AND circuit 226 is connected to an input of a logical OR circuit 75 which has its output connected to the input of a west current source 76. The west current source 76 is substantially identical to the east current source 56 and it has its output also connected to capacitor store 60. Hence, the current sources 56 and 76 function to change the charge across the capacitors of capacitor store 60 in different or opposite phases and this in turn causes the beam to move east or west, depending upon which current source is activated at the particular time. The east and west movement of the beam is under control of the high impedance amplifier 65 and the horizontal deflection circuit 70. While there are other elements for effecting horizontal deflection, as will be seen shortly, the logical OR circuits 55 and 75 and the current sources 56 and 76, capacitor store 60, high input impedance amplifier 65 and deflection circuits 70 are part of the horizontal deflection circuit 50 in FIG. 1.

The logical AND circuits 210 and 218 function to control the movement of the beam in a north and south direction respectively. The output of logical AND circuit 210 is connected to the input of logical OR circuit 105 which has its output connected to the input of north current source 106. The north current source 106 is substantially identical to the east current source 56 and it has its output connected to the input of a capacitor store 115 which is similar to the capacitor store 60. The output of the capacitor store 115 is connected to the input of high input impedance amplifier 120 which has its output connected to vertical deflection circuits 125, which are of the type well known in the art for causing the beam of a cathode ray tube to be deflected in the vertical direction.

The output of the logical AND circuit 218 is connected to the input of a logical OR circuit 130 which has it output connected to the input of a south current source 136. The current source 136 is substantially identical to the current source 56 and has its output connected to the input of capacitor store 115. It is thus seen that when there is an output from logical AND circuit 210, the beam of the cathode ray tube 10 will be caused to be deflected in a vertical direction which has been designated north and when there is an output from logical AND circuit 218, the beam of the cathode ray tube 10 will be deflected in a vertical direction which has been designated south.

It will be recalled that when the beam of the cathode ray tube engaged the curve, it caused the follow latch 310 to be set. The follow latch 310 caused the northeast latch 255 to be set and with the northeast latch 255 set, the beam was caused to travel north under control of logical AND circuit 210, logical OR circuit 105, current source 106, capacitor store 115 and vertical deflection circuits 125. If the beam on its way north moves from black into white, before the beam has remained too long in black, the current source 106 will no longer be energized because there will no longer be an output from logical AND circuit 210 because its input indicating the beam is in black will no longer be satisfied and hence, there will be no output from this logical AND circuit. However, now the inputs to logical AND circuit 202 will be satisfied and hence, there will be an output from logical AND circuit 202 which will activate the current source 56 via logical OR circuit 55 which in turn will cause the beam to move east as the charge in capacitor store 60 increases. The movement of the beam east is under the control of the high impedance amplifier 65 and the horizontal deflection circuits 70.

Now, if the beam as it moves east engages the curve again, it moves into black and the current source 56 will no longer be energized because there will no longer be an output from logical AND circuit 202. However, the inputs to logical AND circuit 210 again will be satisfied and there will be an output therefrom to energize the current source 106 via logical OR circuit 105 whereby the beam will be caused to move north as the charge increases upon capacitor store 115. The movement of the beam north will be again under the control of the high impedance amplifier 120 and the vertical deflection circuit 125. To summarize at this point, it is thus seen that with the northeast latch 255 on or set, the beam is caused to move east when in white and north when in black. By this action, the beam tacks along the edge of a curve which is heading in a northeast direction so as to follow the contour thereof.

If the slope of the curve at either the point where follower action is initiated or at any point thereafter does not slant in a northeast direction, the beam will spend too much time in either white or black and either of these conditions will be detected by the integrators 319 and 326 respectively. If the beam, when traveling north as indicated above in response to an output from logical AND circuit 210, stays in black too long, the voltage developed by the integrator 326 will reach a level where there will be an output from discriminator 327 which will cause the counter-clock-wise latch 332 to be set. With the counter-clock-wise latch 332 set, the reverse single-shot multivibrator 336 will be fired via logical OR circuit 335. With the reverse singleshot 336 fired, the inputs to logical AND circuit 210 no longer will be satisfied, and hence, there will be no output therefrom for energizing the current source 106 which was causing the beam of cathode ray tube 10 to travel in a north direction. However, with the reverse singleshot multivibrator 336 fired, the inputs to logical AND circuit 218 will be satisfied and there will be an output therefrom to energize the current source 136 via logical OR circuit 130. With the current source 136 energized, under this condition, the charge across capacitor store 115 will be varied opposite from that caused by current source 106 whereby the beam will be driven under control of high impedance amplifier 120 and vertical deflection circuit 125 in a south direction to return the beam to the point of origin. The period of the reverse singleshot multivibrator 336 is such as to return the beam to the point of origin. With the beam returned to the point of origin, a new heading is tried. Since the beam timed out in black, the counter-clock-wise latch 332 will be set and as it will be seen shortly, the ring 250 is advanced in a counter-clock-wise direction whereby the north latch 260 becomes set.

The reverse singleshot multivibrator 336 as previously stated, also has its output connected to the input of an inverter 337. The output of inverter 337 is also connected to the inputs of logical AND circuits 340 and 341. The logical AND circuit 340 also has an input connected to the set output of the clock-wise latch 330 and the logical AND circuit 341 has an input connected to the set output of the counter-clock-wise latch 332. Hence, when the signal from the reverse singleshot multivibrator 336 drops, the inverter 337 will be at a level whereby the logical AND circuits 340 and 341 will be conditioned to pass a signal; however, at this time, only the counter-clock-wise latch 332 is set. Hence, there will be an output only from logical AND circuit 341.

The output of logical AND circuit 341 is connected to the inputs of logical AND circuits 355, 358, 360, 363, 365, 368, 370 and 373 of ring control logic 350. The logical AND circuit 355 also has an input connected to the set output of the east latch 251 and an input connected to the reset output of the southeast latch 285. The output of the logical AND circuit 355 is connected to the input of logical OR circuit 256 which has its output connected to the set terminal of the northeast latch 255. Hence, when the inputs to the logical AND circuit 355 are satisfied, there will be an output therefrom for setting the northeast latch 255 via logical OR circuit 256. However, it is seen that there will not be an output from logical AND circuit 355 at this time because the east latch 251 is not set.

The logical AND circuit 358 in addition to the input from logical AND circuit 341 also has an input connected to the reset output of the east latch 251 and an input connected to the set output of the northeast latch 255. The output of the logical AND circuit 358 is connected to an input of logical OR circuit 261 which has its output connected to the set terminal of the north latch 260. Thus, when the inputs to logical AND circuit 358 are satisfied, the north latch 260 will be set via the logical OR circuit 261. It is seen that the inputs to logical AND circuit 358 are satisfied at this time and the north latch 260 will be set. However, for clarity and completeness, the description will continue with regard to the other logical AND circuits having an input connected to logical AND circuit 341.

The logical AND circuit 360 has its output connected to an input of logical OR circuit 266 which has its output connected to the set terminal of the northwest latch 265. The other inputs to logical AND circuit 360 in addition to the input from logical AND circuit 341 are connected to the reset output of the northeast latch 255 and the set output of the north latch 260. Hence, when the inputs to the logical AND circuit 360 are satisfied, the northwest latch 265 will be set via logical OR circuit 266. Of course, the logical AND circuit 360 will not have an output at this time because the south latch 260 is not set.

The logical AND circuit 363 has its output connected to logical OR circuit 271 which has its output connected to the set terminal of the west latch 270. The logical AND circuit 363, in addition to having an input connected to the output of logical AND circuit 341, also has an input connected to the reset output of the north latch 260 and an input connected to the set output of the northwest latch 265. It is seen that the inputs to logical AND circuit 363 are not satisfied because the northwest latch is not set and therefore there is no output from logical AND circuit 363.

Logical AND circuit 365 in addition to an input from logical AND circuit 341 also has an input connected to the reset output of the northwest latch 265 and an input connected to the set output of the west latch 270. The ouput of the logical AND circuit 365 is connected to the set terminal of the southwest latch 275. Hence, when the inputs to logical AND circuit 365 are satisfied, the southwest latch 275 will be set via logical OR circuit 276. The southwest latch 275 will not be set at this time because there is no output from logical AND circuit 365 because the west latch 270 is not set.

The south latch 280 is set under the control of logical AND circuit 368 which has its output connected to the input of logical OR circuit 281, the same having its output connected to the set terminal of the south latch 280. The AND circuit 368 also has an input connected to the reset output of the west latch 270 and an input connected to the set output of the southwest latch 275. Since the southwest latch 275 is not set at this time, the logical AND circuit 368 will not have an output.

The logical AND circuit 370 controls the setting of the southeast latch 285. The output of the logical AND circuit 370 is connected to the input of logical OR circuit 286 which in turn has its output connected to the set terminal of the southeast latch 285. The logical AND circuit 370 in addition to the input from logical AND circuit 341 also has an input connected to the reset output of the southwest latch 275 and an input connected to the set output of the south latch 280. The logical AND circuit 370 will not have an output at this time because the south latch 280 is not set.

The logical AND circuit 373 controls the setting of the east latch 251 and has its output connected to the input of logical OR circuit 252, the same having its output connected to the set terminal of the east latch 251. The logical AND circuit 373 in addition to an input from logical AND circuit 341 also has an input connected to the reset output of the south latch 280 and an input connected to the set output of the southeast latch 285.

Summarizing at this time, it is seen that when in a counter-clock-wise mode, i.e., with the inputs to logical AND circuit 341 conditioned, the north latch 260 will be set if the northeast latch 255 is already in its set condition and the east latch 251 is in its reset condition. Similarly, the northwest latch 265 will be set if the north latch 260 is in its set state and the northeast latch 255 is in its reset state. The west latch 270 will be set if the northwest latch 265 is in its set state and the north latch 260 is in its reset state. The southwest latch 275 will be set if the west latch 270 is in its set state and the northwest latch 265 is in its reset state. The southeast latch 285 will be set if the south latch 280 is in its set state and the southwest latch 275 is in its reset state. The east latch 251 will be set if the southeast latch 285 is in its set state and the south latch 280 is in its reset state. The northeast latch 255 will be set when the east latch 251 is in the set state and the southeast latch 285 is in the reset state.

At this particular time under consideration, the direction ring 250 will be operated whereby the north latch 260 becomes set because the conditions of logical AND circuit 258 are satisfied, i.e., the northeast latch 255 is in the set state, the east latch 251 is in the reset state, and the logical AND circuit 341 is conditioned to pass a signal. The direction ring 250 thus advances from left to right when in a counter-clock-wise mode. This, of course, agrees with the counter-clock-wise advancement from a northeast direction to the north direction.

The northeast latch 255 is reset when the north latch 260 is set. The set outputs of the east latch 251, the north latch 260, the west latch 270, and the south latch 280 are connected to inputs of a logical OR circuit 344 which has its output connected to the AC reset input of a trigger 346. By this arrangement, when either the east latch 251, the north latch 260, the west latch 270 or the south latch 280 are set, the trigger 346 is switched and the switching of this trigger provides a negative going reset impulse which is utilized to reset the northeast latch 255, the northwest latch 265, the southwest latch 275 and the southeast latch 285. This is accomplished by connecting the set output of the trigger 346 to a delay 347 and the output of the delay 347 is connected to the reset input of northeast latch 255 and to the inputs of logical OR circuits 267, 277 and 287, which in turn have their outputs connected to the reset terminals of the northwest latch 265, the southwest latch 275 and the southeast latch 285 respectively. The delay 347 permits the direction ring 250 to be advanced prior to resetting the stage which had been on. Hence, it is seen that when the north latch 260 was set, it caused the resetting of the northeast latch 255 which had previously been set because the setting of the north latch 260 developed an impulse via logical OR circuit 344 by means of trigger 346 and the impulse was delayed slightly to permit the setting of the north latch prior to the resetting of the northeast latch 255.

With the north latch 260 set, the beam of the cathode ray tube 10 is directed to follow a curve heading north under the control of logical AND circuits 203 and 211 of FIG. 2. The logical AND circuit 203 has an input connected to the set output of the north latch 260 which provides an indication that the north latch 260 is on, an input connected to the output of inverter 315 so as to provide an indication that the beam is in white, and an input connected to the output of inverter 337 so as to provide an indication that the reverse singleshot 336 has not been fired. The logical AND circuit 211 has an input connected to the set output of the north latch 260 which thus provides an indication that the north latch 260 is on, an input connected to the output of the video amplifier 26 which provides an indication that the beam is in black and an input connected to the output of the inverter 337 so as to provide an indication that the reverse singleshot multivibrator 336 has not been fired.

The output of logical AND circuit 203 is connected to an input of a logical OR circuit 57 which has its output connected to the east current source 56 and is also connected to an input of a logical OR circuit 107 which has its output connected to the north current source 106. Hence, it is seen that when the logical AND circuit 203 is conditioned to pass a signal, the signal will be directed via logical OR circuits 57 and 107 to the current sources 56 and 106 respectively. The potential on capacitor stores 60 and 115 will be changing and the beam will be deflected by both the horizontal and vertical deflection circuits 70 and 125, whereby the beam will be deflected in a northeast direction. At this time, the current sources 56 and 106 would be delivering only .707 times their normal current. The reduced current is required when the two current sources are on simultaneously to equalize the velocity of the beam along the 45° path with respect to its velocity along the horizontal and vertical axis of the cathode ray tube 10.

The output of the logical AND circuit 211 is connected to the input of a logical OR circuit 108 and to the input of a logical OR circuit 58. The output of the logical OR circuit 108 is connected to the north current source 106 and the output of the logical OR circuit 58 is connected to the west current source 76. Hence, when there is an output from the logical AND circuit 211, the current sources 76 and 106 will be energized to deliver only .707 times their normal current, whereby the capacitor stores 60 and 115 will be charged and the beam will be driven in a northwest direction under control of the horizontal and vertical deflection circuits 70 and 125 respectively.

Since the beam had timed out in black and was returned to its initial position just prior to the time-out excursion, the beam is still in black and it will head northwest after the north latch 260 has been set. The beam will now either be in black too long or will cross over from black into white. If the beam crosses from black to white, the inputs to logical AND circuit 211 will no longer be satisfied, however, the inputs to logical AND circuit 203 will become satisfied and the current sources 56 and 106 will be energized via logical OR circuits 57 and 107 and the capacitor stores 60 and 115 will be charged whereby the beam will be caused to move in a northeast direction under control of the horizontal and vertical deflection circuits 70 and 125 respectively.

Of course, if the beam times out in black, the direction ring 250 will again be advanced in a counter-clockwise direction whereby the northwest latch 265 becomes set. The setting of the northwest latch 265 at this time will be under control of the logical AND circuit 365. This action takes place after the counter-clockwise latch 332 is set and the signal from the reverse singleshot multivibrator 336 has dropped whereby logical AND circuit 341 passes a signal for conditioning logical AND circuit 360.

If the beam does not time out in black when the north latch 260 is set, but does make a transition from black to white while heading on the northwest tack, then logical AND circuit 211 will no longer be conditioned and the logical AND circuit 203 will become conditioned whereby the beam will be caused to move in a northeast direction because the current sources 56 and 106 will be energized, thus the capacitor stores 60 and 115 will be charged and the beam will be deflected by the horizontal and vertical selection circuits 70 and 125 respectively in a northeast direction.

If the beam now traveling in a northeast direction remains in white too long, the discriminator 320 will develop an impulse as the voltage generated by integrator 319 rises above the predetermined level. The pulse developed by discriminator 320 will set the clockwise latch 330 which in turn will fire the reverse singleshot multivibrator 336 via the logical OR circuit 335. Under these conditions, the direction ring 250 will be advanced in a clockwise direction due to the fact that the inputs to logical AND circuit 340 are satisfied. The output of logical AND circuit 340 is connected to the inputs of logical AND circuits 375, 378, 380, 383, 385, 388, 390, 393, which, as it will be seen shortly, function to control the setting of the latches of direction ring 250 when in a clockwise mode.

The logical AND circuit 375 has in addition to the input from the logical AND circuit 340 an input from the reset output of the northeast latch 255 and an input connected to the set output of the east latch 251. The output of the logical AND circuit 375 is connected to the input of logical OR circuit 286 which in turn has its output connected to the set terminal of the southeast latch 285. Hence, when the inputs to the logical AND circuit 375 have been satisfied, the southeast latch 285 will be set.

The logical AND circuit 378 controls the setting of the east latch 251. The output of the logical AND circuit 378 is connected to an input of logical OR circuit 252 which has its output connected to the set terminal of the east latch 251. The logical AND circuit 378 also has an input connected to the set output of the northeast latch 255 and an input connected to the reset output of the north latch 260. Hence, with the northeast latch 255 set and the north latch 260 reset and if the beam times out in white, then the east latch 251 is set because the inputs to logical AND circuit 378 will be satisfied.

Logical AND circuit 380 controls the setting of the northeast latch 255 and has its output connected to the input of logical OR circuit 256 which in turn has its output connected to the set terminal of northeast latch 255. The logical AND circuit 380 also has an input connected to the set terminal of the north latch 260 and an input connected to the reset terminal of the northwest latch 265. The northeast latch 255 will be set under the conditions that the north latch 260 is set, the northwest latch 265 is reset, and the beam has timed out in white.

When in a clockwise mode, the north latch 260 is set under the control of logical AND circuit 383 which has its output connected to the input of logical OR circuit 261 the same having its output connected to the set terminal of the north latch 260. The logical AND circuit 383 also has an input connected to the set output of the northwest latch 265 and an input connected to the reset output of the west latch 270. Thus the north latch 260 will be set under the conditions that the northwest latch 265 is set, the west latch 270 is reset and the beam times out in white.

Logical AND circuit 385 in addition to an input from logical AND circuit 340 also has an input connected to the set output of the west latch 270 and an input connected to the reset output of the southwest latch 275. The output of the logical AND circuit 385 is connected to the input of logical OR circuit 266 which in turn has its output connected to the set terminal of the northwest latch 265. Hence, the northwest latch 265 will be set under the conditions that the west latch 270 is set, the southwest latch 275 is reset and the beam has remained in white too long.

The output of the logical AND circuit 388 is connected to an input of logical OR circuit 271, the same having its output connected to the set terminal of the west latch 270. The logical AND circuit 388 in addition to an input from the logical AND circuit 340 has an input connected to the set output of the southwest latch 275 and an input connected to the reset output of the south latch 280. Hence, the west latch 270 will be set when the southwest latch 275 is set, the south latch 280 is reset and the beam has remained in white too long.

The southwest latch 275 is set when operating in a clockwise mode by the logical AND circuit 390. The logical AND circuit 390 has its output connected to the input of logical OR circuit 276 which in turn has its output connected to the set terminal of the southwest latch 275. The logical AND circuit 390 has an input connected to the set output of the south latch 280 and an input connected to the reset output of the southeast latch 285. The southwest latch 275 will thus become set when in the clockwise mode under the conditions that the south latch 280 is set, the southeast latch 285 is reset and the beam has remained too long in white.

The logical AND circuit 393 controls the setting of the south latch 280 and has its output connected to the input of logical OR circuit 281. The output of logical OR circuit 281 is connected to the set terminal of the south latch 280. The logical AND circuit 393 also has an input connected to the set output of the southeast latch 285 and an input connected to the reset output of the east latch 251. By this arrangement, the south latch 280 will be set when the southeast latch 285 is set, the east latch 251 is reset, and the beam has remained too long in white.

From the foregoing, it is seen that the direction ring 250 will be advanced in a clockwise direction when the beam has remained too long in white. Briefly, if the east latch 251 is set and the beam times out in white, then the southeast latch 285 will become set. If the southeast latch 285 is set and the beam remains too long in white, the south latch 280 becomes set. Similarly, if the south latch 280 is set and the beam remains too long in white, the southwest latch 275 becomes set. Likewise, if the southwest latch 275 is set, and the beam remains too long in white, the west latch 270 becomes set. If the beam remains too long in white while the west latch 270 is set, the northwest latch 265 becomes set. The north latch 260 becomes set if the beam remains too long in white while the northwest latch 265 is set. The northeast latch 255 becomes set when the north latch 260 is set and the beam remains too long in white. The east latch 251 will become set when the beam has remained too long in white and the northeast latch 255 has been set. It is seen that when operating in the clockwise mode, the direction ring advances from right to left in FIG. 2 as the beam times out in white.

The set output from the northeast latch 255, the northwest latch 265, the southwest latch 275 and the southeast latch 285 are connected to inputs of a logical OR circuit 345 which has its output connected to the set AC input of the trigger 346. It will be recalled that the set output of the trigger 346 is connected to delay 347. The output of the delay 347 is also connected to the input of an inverter 348 which has its output connected to the inputs of logical OR circuits 253, 262, 272 and 282. Hence, whenever the northeast latch 255, the northwest latch 265, the southwest latch 275 or the southeast latch 285 is set, the east latch 251, the north latch 260, the west latch 270 and the south latch 280 will, after a short delay, be reset. It should also be noted that the set and reset outputs of the trigger 346 are connected to inputs of logical OR circuit 343 which has its output connected to the input of a singleshot multivibrator 349. The output of the singleshot multivibrator 349 is connected to the reset terminals of the clockwise latch 330 and the counter clockwise latch 332.

From the above, it is seen that the direction ring can be advanced either clockwise or counter-clockwise to each of the eight directions identified. Further, the action of the beam has been described under the conditions when the northeast latch 255 and the north latch 260 have been set. It should now be noted that if the east latch 251 is set, logical AND circuits 201, 209, 217 and 225 will be conditioned thereby, because each of these logical AND circuits has an input connected to the set output of the east latch 251. Logical AND circuits 201 and 209 function to cause the beam to tack along a curve heading in the east direction when in the clockwise mode. Logical AND circuit 201 cause the beam to travel southeast when the same is in white, while logical AND circuit 209 causes the beam to travel northeast when in black. Logical AND circuit 201 has an input connected to the output of inverter 315 for indicating that the beam is in white and an input connected to the output of inverter 337 for indicating that the reverse singleshot multivibrator 336 has not fired. The output of the logical AND circuit 201 is connected to an input of logical OR circuits 57 and 131.

The output of logical OR circuit 57 as previously described, is connected to an input of the east current source 56. The output of the logical OR circuit 131 is connected to the input of the south current source 136. If the east current source 56 and the south current source 136 are energized, the beam will be moved in a southeast direction under control of the horizontal and vertical deflection circuits 70 and 125 respectively.

The logical AND circuit 209 has an input connected to the output of the video amplifier 26 to indicate that the beam is in black and an input connected to the output of the inverter 337 to provide an indication that the reverse singleshot multivibrator 336 has not fired. The output of the logical AND circuit 209 is also connected to an input of logical OR circuit 57 and to an input of logical OR circuit 107. Again, the output of logical OR circuit 57 is connected to an input of the east current source 56 and the output of logical OR circuit 107 is connected to an input of the north current source 106. With the east current source 56 and the north current source 106 energized, the beam will be directed to move in a northeast direction under control of the horizontal and vertical deflection circuits 70 and 125.

Logical AND circuits 217 and 225 function to return the beam when it is tacking a curve heading in an east direction and the beam times out in either black or white because the curve has changed direction. Logical AND circuit 217 functions to cause the beam to return to its initial starting position during an excursion when it times out in black and logical AND circuit 225 causes the beam to return to its initial starting position during an excursion when it times out in white. Hence, logical AND circuit 217 has an input connected to the output of the reverse singleshot multivibrator 336 and an input connected to the set output of the counter-clock-wise latch 332. The output of logical AND circuit 217 is connected to an input of a logical OR circuit 59 and to an input connected to an input of logical OR circuit 132. The output of logical OR circuit 59 is connected to an input of the west current source 76 and the output of logical OR circuit 132 is connected to an input of the south current source 136. With the west current source 76 and the south current source 136 energized, the beam will move in a southwest direction under control of the horizontal and vertical deflection circuits 70 and 125 respectively.

The logical AND circuit 225 has an input connected to the output of the reverse singleshot multivibrator 336 and an input connected to the set output of the clock-wise latch 330. The output of the logical AND circuit 225 is connected to an input of logical OR circuit 108 and to an input of logical OR circuit 58. It will be recalled that the output of logical OR circuit 108 is connected to the north current source 106 and the output of logical OR circuit 58 is connected to an input of the west current source 76. With the north current source 106 and the west current source 76 energized, the beam will move in a northwest direction under control of the horizontal and vertical deflection circuit 70 and 125 respectively.

It is believed that the foregoing detailed description of the logical AND circuits for controlling the individual current sources for controlling the deflection of the beam in the described directions makes it unnecessary to provide a further detailed description of the remaining logical AND circuits for controlling the current sources for causing the deflection of the beam in a particular direction. Hence, from examining FIG. 2, it is seen that logical AND circuits 204, 212, 220 and 228 are conditioned by the northwest latch 265 and therefore will pass a signal only when that latch is set. Logical AND circuits 204 and 212 function to select a deflection of the beam in a north and west direction respectively when in a clock-wise mode. If the beam times out in either black or white logical AND circuits 220 and 228 will be effective. Logical AND circuit 220 causes the beam to travel in an east direction so as to return the beam to its original position when timing out in black during a particular excursion. Logical AND circuit 228 controls the ultimate deflection of the beam in a south direction if it times out in white when tacking a curve heading in a northwest direction.

Logical AND circuits 205, 213, 221, 229 control the deflection of the beam when the west latch 270 is set. The logical AND circuit 205 functions to select the current sources which cause the beam to travel in a northwest direction while the logical AND circuit 213 selects the current sources for causing the beam to travel in a southwest direction. Logical AND circuit 221 functions to select the current sources to cause the beam to be returned to its starting point when it times out in black and logical AND circuit 229 functions to select the current sources to return the beam to its starting point when it times out in white.

Logical AND circuits 206, 214, 222 and 230 are under the control of the southwest latch 275. Hence, the logical AND circuit 206 selects the current sources for controlling the travel of the beam in a west direction while logical AND circuit 214 selects the current sources to control the travel of the beam in a south direction. If the beam when tacking a curve heading in a southwest direction times out in black, logical AND circuit 222 selects the current sources for returning the beam to its starting point for that particular excursion by causing the beam to head in a north direction. If the beam times out in white, while tacking the curve heading in a southwest direction, the logical AND circuit 230 selects the current sources which cause the beam to return to its starting point for that excursion by causing the beam to travel in an east direction.

The south latch 280 controls the operation of logical AND circuits 207, 215, 223 and 231. When tacking a curve heading in a south direction, the logical AND circuit 207 selects the current sources to cause the beam to move southwest and logical AND circuit 215 selects the current sources for causing the beam to move southeast. If the beam times out in black, logical AND circuit 223 selects the current sources for causing the beam to return to its starting point by moving in a northwest direction and if the beam times out in white, logical AND circuit 231 selects the current sources to cause the beam to return to its starting position by moving the beam in a northeast direction.

Logical AND circuits 208, 216, 224 and 232 are under the control of the southeast latch 285. When the beam is to tack a curve heading in a southeast direction, logical AND circuit 208 selects the current sources for causing the beam to travel south and logical AND circuit 216 selects the current sources to cause the beam to travel east. If the beam, while traveling east, times out in black, the logical AND circuit 224 selects the current sources to cause the beam to go in a west direction so as to return to its starting position for that excursion. If the beam times out in white, when tacking a curve heading in a southeast direction, the logical AND circuit 232 selects the current sources for causing the beam to return to its initial starting position for that excursion by causing the beam to travel north.

From the foregoing, it is seen that the beam of the cathode ray tube 10 is caused to follow the contour of the curve by tacking along the edge thereof. Further, it is seen that the length of excursion by any particular tack is variable and depends upon whether or not the beam makes a transition from black to white or vice versa. Additionally, there is a maximum limit for any one particular excursion in either black or white. If the beam times out in white, it returns to its initial starting position for that particular excursion and the direction ring 250 is advanced in a clock-wise mode. If the beam times out in black for a particular excursion, then the direction ring is advanced in a counter-clock-wise mode.

Figure 4A:
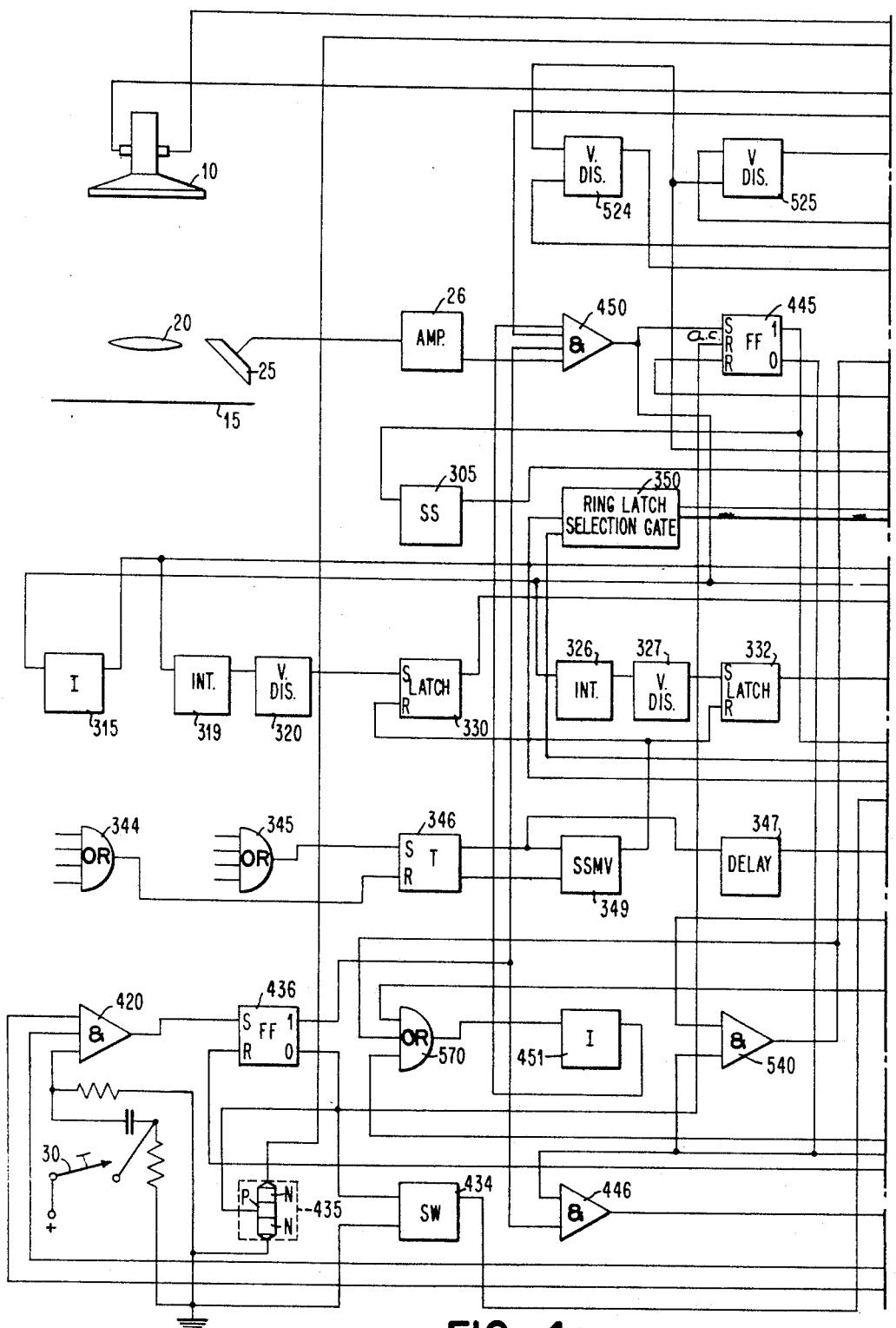
Figure 4B:
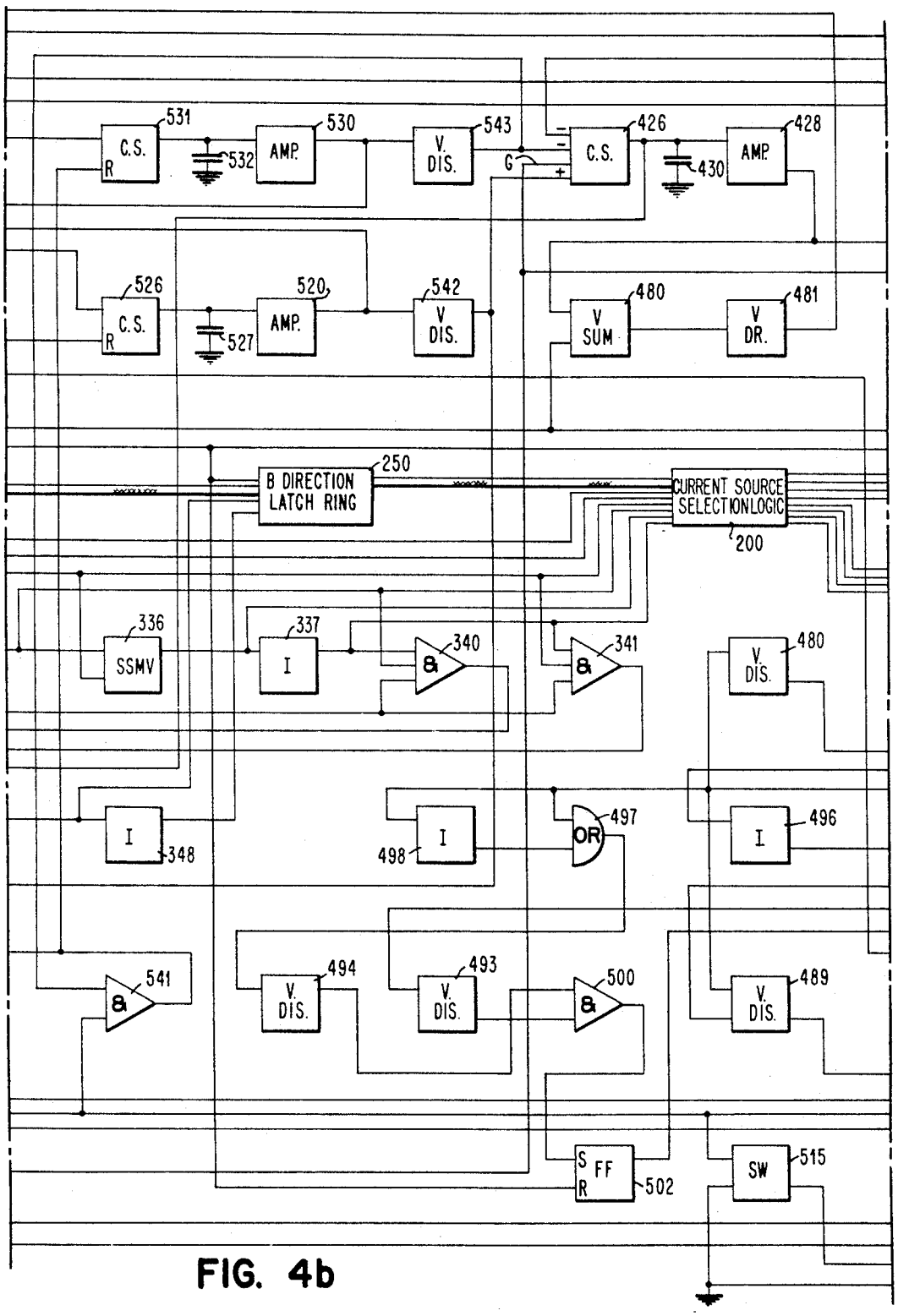
Figure 4C:
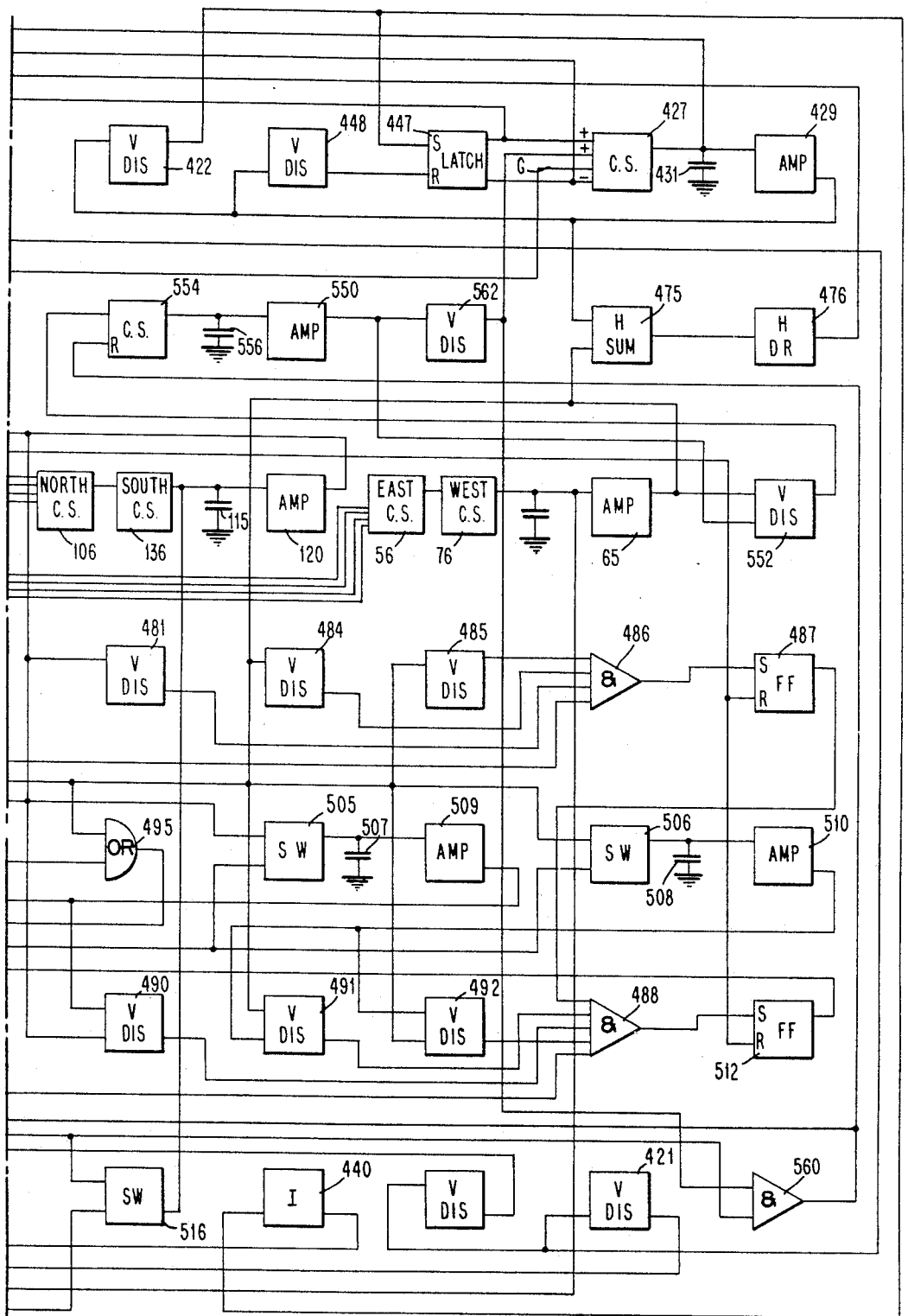

In order to gain a better appreciation of the invention, a more sophisticated searching control circuit has been included as shown in FIG. 4. This particular search control circuit is particularly useful in optical character recognition machines incorporating this invention. The search control circuit can best be understood by first referring to FIG. 5. The document 15 of FIG. 1 is registered relative to the cathode ray tube 10 by scanner registration stops 410 as shown in FIG. 5. With the document 15 registered relative to the cathode ray tube 10, the searching operation begins by causing the beam to come to a home position 16 which is a predetermined position relative to the registered document 15. With the beam in the home position 16, a raster search path 17 scanning from left to right in a horizontal direction is made. If the beam does not encounter a character on the first horizontal raster search path, it flies back along path 18 and advances to the next horizontal line of search during fly back. The search continues in this manner until a first character is engaged. After the beam encounters a first character, the raster search mode of operation is discontinued and a follow mode is initiated whereby the beam is caused to follow the character in a tack manner as described above. After the beam has completed the entire loop around the character, the search mode of operation is re-started at a point 19 to the right of the character it has just followed. By this arrangement, a series of characters in a line or row can be scanned sequentially. If more than one row of characters exist, the rows can be scanned sequentially by adjusting the raster vertical increment to exceed one-half the height of the curves being scanned.

With the document 15 registered relative to the cathode ray tube 10, an operation is initiated by depressing ready key 30, FIG. 4. The ready key 30 completes a circuit from a positive potential to the input of a logical AND circuit 420. Logical AND circuit 420 also has an input into the output of a discriminator 421 and an input connected to the output of a discriminator 422. As it will be seen shortly, the conditions of logical AND circuit 420 will be satisfied when the beam is in the home position 16, as illustrated in FIG. 5.

Since the vertical and horizontal coordinates of the beam are controlled by current sources 426 and 427 and high impedance amplifiers 428 and 429 respectively, the beam can be placed at its home position by resetting capacitors 430 and 431. The resetting of the capacitors 430 and 431 is accomplished by NPN transistor switches 434 and 435 respectively. The switches 434 and 435 are operated under the control of a start-finish flip-flop 436 which is in its finish state when an operation begins. The new setting of the capacitors 430 and 431 is monitored by discriminators 421 and 422 respectively. Discriminator 422 determines when the beam has moved to the left of the home position coordinate and the discriminator 421 determines when the beam has moved above the coordinate of the home position.

With the beam in the home position, the polarity of the discriminator 421 is up or positive so as to condition logical AND circuit 420. However, with the beam in home position, the output of discriminator 422 is down, and therefore, the output of the discriminator 422 is connected to the input of an inverter 440 which has its output connected to an input of logical AND circuit 420. When the start-finish flip-flop 436 is set, it is in a start state and the beam of the cathode ray tube 10 can be set in motion along a raster search path. The reset output of the start-finish flip-flop 436 is connected to an A/C reset input of a search follow flip-flop 445. By this arrangement, when the start-finish flip-flop 436 switches from its finish state or reset state to its set or start state, the search follow flip-flop 445 is reset to a search state. The output of the flip-flop 445 for indicating that the same is in its search state is connected to the input of a logical AND circuit 446. The logical AND circuit 446 also has an input connected to the set output of start-finish flip-flop 436 which indicates that the start-finish flip-flop 436 is in its start state. The output of logical AND circuit 446 is connected to a gating input of current sources 426 and 427 respectively. Hence, with the start-finish flip-flop 436 set to its start state and the search follow flip-flop 445 reset to the search state, the current sources 426 and 427 will be gated on. Initially, the current source 426 remains inoperative because at this time none of the inputs thereto except the gate input are active. However, there is an active input into the current source 427 which charges capacitor 431 and the high impedance amplifier 429 causes the beam to move from the home position along a horizontal path 17 to the right as shown in FIG. 5. The movement of the beam along the horizontal path 17 is under control of discriminator 422 and a latch 447. The latch 447 has its set output connected to a positive current source and its reset output to a negative current source of current sources 427 so as to develop therefrom a positive current source when the latch 447 is in one state or its set state and a negative current course when it is in its other or reset state. When the beam of the cathode ray tube reaches the extreme right end of the image field, a discriminator 448 switches the latch 447 to its other or reset state so as to initiate the fly back of the beam by selecting negative current sources of current sources 426 and 427. With the current sources 426 and 427 providing an output in a negative sense, the beam flies back along a path 18 in FIG. 5 and when it reaches the extreme left of the image field, the discriminator 422 switches latch 447 to its set state. This stops the vertical motion of the beam and reverses the horizontal velocity of the beam. It should be noted that during fly back of the beam, a logical AND circuit 450 is inhibited so as not to cause the change in state of the search follow flip-flop 445 which has a set input connected to the output of logical AND circuit 450. Additionally, it may be noted that the logical AND circuit 450 is also inhibited during the time the beam moves across the curve it has already followed so that the beam can start searching for the next curve. In this situation, the inhibit function is provided by an inverter 451. The exact way in which this is accomplished will be described later herein. Hence, the search follow flip-flop 445 can only be set in a follow mode during the time the beam moves from left to right.

As the beam continues searching for the curve, its encounter with the edge of the curve is detected by photomultiplier 25 which has its output, it will be recalled, connected to the input of video amplifier 26. In this instance, the output of the video amplifier 26 is connected to an input of the logical AND circuit 450. The logical AND circuit 450, it will be recalled, also has an input connected to the output of inverter 451, an input connected to the set output of latch 447 and an input connected to the set output of start-finish flip-flop 436. The inputs to logical AND circuit 450 will be satisfied at this time because the start-finish flip-flop 436 is in its set state, the latch 447 is in its set state, the output from the inverter 451 will be up at this time and the input from the video amplifier 26 will be up because the beam has engaged the edge of the curve. Accordingly, there will be an output from logical AND circuit 450 and this output will set the search follow flip-flop 445 into the follow mode. When the search follow flip-flop 445 is set to the follow mode, the raster search mode of the beam is stopped because the inputs to logical AND circuit 446 will no longer be satisfied and therefore, the gates for current sources 426 and 427 will be down. Hence, there can be no output from current sources 426 and 427 to control the movement of the beam of cathode ray tube 10.

The search follow latch 445 is substantially identical in function with the search follow latch 310 of FIG. 2.

Hence, with the search follow latch 445 set in the follow mode, the motion of the beam of cathode ray tube is under control of the north and south current sources 106 and 136 for movement in a vertical direction and under control of current sources 56 and 76 for movement in a horizontal direction. The output of the high impedance amplifier 65 is connected to the input of a horizontal summer 475 which also has an input from the output of high impedance amplifier 429. The output of high impedance amplifier 120 is connected to an input of a vertical summer 480 which also has an input connected to the output of high impedance amplifier 428. The outputs of summers 475 and 480 are connected to inputs of horizontal driver 476 and vertical driver 481 respectively which have their outputs connected to the deflection yoke of the cathode ray tube 10.

The operation of the direction ring 250 is the same as it was previously described and it is initially set so that the northeast latch 255 is in its set state, and the other latches 251, 260, 265, 270, 275, 280 and 285 are in their reset state. The deflection selection logic 200 controls the current sources 56 and 106 so that the beam will move north when in black and east when in white.

With reference to FIGS. 5 and 6, it is seen that the beam engages the curve which is represented as a W in FIG. 5, and then, since the beam is in black, it heads in a north direction. During the travel of the beam in the north direction, it passes from black to white and upon doing so, the beam is caused to be moved in an east direction as previously described and particularly shown in detail in FIG. 6a. As the beam moves in the east direction, it times out in white and the clock-wise latch 330 is set. With the clock-wise latch 330 set, the reverse singleshot multivibrator 336 is fired and as previously described, this causes the beam to return to its starting position it had when beginning the eastward movement as seen in FIG. 6b. After the reverse singleshot multivibrator 336 has timed out, the clock-wise latch 330 in effect causes the direction ring 250 to be advanced in a clock-wise direction and therefore the east latch 251 becomes set and as previously described, the northeast latch 255 will be reset shortly thereafter. With the east latch 251 set, the beam will follow the curve in an east direction by going in a southeast direction when in white and a northeast direction when in black. Hence, since the beam had returned to its starting point during the previous excursion in white, it is still in white and therefore, will head in a southeast direction as seen in FIG. 5 and FIG. 6c and it will cross over from white into black. As the beam crosses from white into black, it will head northeast in black and in doing so, it will go from black into white. The beam will then be caused to move southeast again. However, as shown in FIG. 6c, the beam again times out in white and returns to its starting point as shown in FIG. 6d. Again the clock-wise latch 330 will be set and the reverse singleshot 336 will be fired. The direction ring 250 will be advanced in a clock-wise mode whereby the southeast latch 285 is set and with the setting of the southeast latch 285, the east latch 251 becomes reset. It will be recalled that when the southeast latch 285 is set, the beam will follow a curve heading in a southeast direction by moving south in white and east in black. Since the beam is presently in white, it will move south as shown in FIG. 6e. The beam will cross from white to black and hence, will change its movement to travel in an east direction in black and in doing so it will go from black to white. With the beam again in white, it will travel south and cross from white to black and again change its direction so as to move east and it will go from black to white. This action can continue so long as the curve is heading in a southwest direction as shown in FIG. 6e.

It is seen that in FIGS. 5 and 6f, the beam will eventually time out in black as it is following the curve in a southeast direction. When the beam times out in black, this will be detected by cooperative action of black integrator 326 and discriminator 327 whereby the counter-clock-wise latch 332 will be set. With the counter-clock-wise latch 332 set, the reverse singleshot multivibrator 336 will be fired. With the reverse singleshot multivibrator 336 fired, the beam will return to its starting point for that particular excursion in black and thereafter, after the signal from the reverse singleshot multivibrator 336 expires, the direction ring 250 will be advanced in a counter-clock-wise mode. Hence, the east latch 251 will again become set and the southeast latch 285, which had been set, will become reset.

With the east latch 251 set, the beam moves northeast when in black and southeast when in white. Therefore, since the beam is presently in black, it will move northeast and as seen in FIGS. 5 and 6g, it again times out in black. Again, the counter-clock-wise latch 332 will be set by discriminator 327 and the reverse singleshot multivibrator 336 will be fired. The beam will return to its starting point and after the output from the reverse singleshot multivibrator 336 expires, the direction ring 250 again will be advanced in a counter-clock-wise direction whereby the northeast latch 255 becomes set and the east latch 251 is reset. It will be remembered that the beam is still in black, and therefore, with the northeast latch 255 set, the beam will travel north and in doing so it moves from black into white as shown in FIGS. 5 and 6i. The beam then continues to follow the curve W as shown in FIG. 5.

In order to determine when the beam has completely followed around a curve, i.e. in this instance the W or any other curve, under ideal conditions, it is simply necessary to measure the distance between the starting point and the instantaneous position of the beam. When this distance is zero, it can be concluded that the beam has completely followed the contour of the curve. However, in practice, because of drift and other parameters, a different approach is required to determine if the beam has come sufficiently close to the original starting point in order that one may determine that the beam has completely followed the curve. This approach for determining when the beam has completely followed the curve is graphically illustrated in FIG. 7.

The starting position of the beam in the follow mode is contained within the boundaries of box A. The lower and upper bounds of box A are defined by the discriminators 480 and 481. Similarly, the discriminators 484 and 485 define the left and right boundaries of box A. Since the discriminators 480, 481, 484 and 485 are all referenced to ground, they define a region enclosing the beam when the current sources 56, 76 and 106 and 136 are reset. Hence, the beam is initially contained in box A when starting the following of the curve. The discriminators 480, 481, 484 and 485 have their outputs connected to inputs of a logical AND circuit 486. The output of the logical AND circuit 486 is connected to the set input of a flip-flop 487. However, the flip-flop 487 will not be switched at this time because the reset terminal of flip-flop 487 is connected to the initial set singleshot multivibrator 305 which has a pulse of sufficient length to hold the flip-flop 487 reset so that the beam can move out of box A before the flip-flop 487 is set.

The set output of the flip-flop 487 is connected to an input of a logical AND circuit 488. The other inputs to logical AND circuit 488 are from the outputs of discriminators 489, 490, 491 and 492. These discriminators define a box B in a manner similar to the way box A is defined. As it will be seen shortly, it is also necessary to determine the distance between box A and box B. The circuits for defining the distance between boxes A and B require that the vertical and horizontal components of the displacement exceed a minimum value commensurate with the drift and other errors of the system. Essentially, the rectified outputs of high impedance amplifiers 65 and 120 are compared with constants set by discriminators 493 and 494 respectively. The output of high impedance amplifier 65 is connected to an input of a logical OR circuit 495 and to an input of an inverter 496. The output of inverter 496 is connected to another input of logical OR circuit 495 which has its output connected to the input of discriminator 493. Similarly, the output of the high impedance amplifier 120 is connected to an input of a logical OR circuit 497 and to an input of an inverter 498. The output of inverter 498 is also connected to the input of logical OR circuit 497. The output of logical OR circuit 497 is connected to an input of discriminator 494. The outputs of discriminators 493 and 494 are connected to inputs of a logical AND circuit 500. When the inputs to the discriminators 493 and 494 are such that they equal constants set by these discriminators, then the outputs of the discriminators will be conditioning logical AND circuit 500 and the same will pass an impulse to set flip-flop 502. The output of flip-flop 502 is connected to inputs of switches 505 and 506. When flip-flop 502 is set, the switches 505 and 506 are turned off and hence, the coordinates for box B are stored by capacitors 507 and 508 to provide a reference of the coordinates to the discriminators 489, 490, 491 and 492 via the high impedance amplifiers 509 and 510 respectively.

After the beam moves out of box B and around the curve and re-enters into the A box, the logical AND circuit 486 passes an impulse to set the flip-flop 487. The flip-flop 487 is settable at this time because there will not be an impulse from the initial set singleshot multivibrator 305 which is attempting to hold the flip-flop 487 reset. With the flip-flop 487 set, the logical AND circuit 488 is conditioned to pass an impulse for setting flip-flop 512, the logical AND circuit 488 having its output connected to the set terminal of the flip-flop 512. The set output of the flip-flop 512 is connected to the reset terminal of the search follow flip-flop 445 so as to reset the same thereby setting the search follow flip-flop 445 in the search mode.

With the search follow flip-flop 445 in the search mode, switches 515 and 516 are operable for resetting the current sources 56 and 76 and 106 and 136 respectively. At the same time, the current sources 426 and 427 turn on and drive the beam to a point such as 19 in FIG. 5. The location of point 19 is defined by a group of monitoring circuits. The vertical coordinate of point 19 is obtained by transferring to the format integrator consisting of current source 426, capacitor 430, and high impedance amplifier 428 a charge equal to $$\frac{\Delta YMAX - \Delta YMIN}{2}$$

where $\Delta YMAX$ and $\Delta YMIN$ are the electrical equivalents of the maximum and minimum vertical deflections of the beam produced by the north and south current sources 106 and 136.

The quantity $\Delta YMAX/2$ is obtained by comparing the output of a high impedance amplifier 520 with that from high impedance amplifier 120 by means of discriminator 524. When the output of the high impedance amplifier 120 exceeds that from high impedance amplifier 520, discriminator 524 turns on a current source 526 which continues to run until the output of high impedance amplifier 520 catches up with the output of high impedance amplifier 120.

The quantity $\Delta YMIN/2$ is obtained by comparing the output of high impedance amplifier 530 with the output of high impedance amplifier 120 by means of discriminator 525. When the output of high impedance amplifier 120 exceeds the output from high impedance amplifier 530, discriminator 525 turns on current source 531 and it continues to run until the output of high impedance amplifier 530 catches up with the output of high impedance amplifier 120.

The subtraction of these two quantities, i.e., $$\Delta YMAX - \Delta YMIN$$

is performed by concurrent operation of positive and negative current sources of current source 426 during reset time of capacitors 527 and 532. The capacitors 527 and 532 are reset by logical AND circuits 540 and 541, respectively, which have their outputs connected to current sources 526 and 531 respectively. The negative current sources in current sources 526 and 531 run until the discriminators 542 and 543 switch and thereby indicate that the reset has been completed.

The horizontal coordinate of point 19 is similarly obtained. The quantity $\Delta XMAX$ is obtained by comparing the output of the high impedance amplifier 550 with that of high impedance amplifier 65 by means of discriminator 552. When the output of high impedance amplifier 65 exceeds that of high impedance amplifier 550, the discriminator 552 turns on current source 554 which will continue to run until the output of high impedance amplifier 550 catches up with the output of high impedance amplifier 65.

The storage circuit comprising current source 554, capacitor 556 and high impedance amplifier 550 is reset by a logical AND circuit 560 which has its output connected to an input of the current source 554. During reset time, discriminator 562 activates a positive current source of the current source 427, the output of the discriminator 562 being connected to the positive input of current source 427. The input to discriminator 562 is connected to the output of high impedance amplifier 550. The activation of the positive current source of current source 427, charges the horizontal format integrator comprising current source 427, capacitor 431 and high impedance amplifier 429 with an incremental voltage proportional to $\Delta XMAX$ where $\Delta XMAX$ is the electrical equivalent to the maximum horizontal deflection of the beam produced by the east-west current sources 56 and 76.

While the beam is moving to point 19 across the curve W which it had just traced, the video must be blanked to prevent extraneous signals from switching the search follow flip-flop 445 to its follow mode prematurely. This function is performed by logical OR circuit 570 and inverter 451. The output of the inverter 451 is connected to an input of logical AND circuit 450 to inhibit the same at this time. The logical OR circuit 570 has an input from the output of logical AND circuit 540, an input connected to the output of logical AND circuit 541, and an input from the output of logical AND circuit 560. After the video is unblanked, i.e., by conditioning the logical AND circuit 450, the search follow flip-flop 445 still remains in the search state, but it will be able to be set into the follow state when the beam engages the adjacent curve 22 as it moves away from point 19 to the right along path 21.

From the foregoing it is seen that this invention provides an electronic curve follower which is capable of following along the edges of a curve including human readable characters. Further, it is seen that format control is available for locating the curve to be followed. Additionally, it is seen that a practical way is presented for determining when the following of a curve has been completed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electronic curve follower comprising:
   deflection selection logic means having a plurality of inputs and outputs with the outputs connected to horizontal and vertical deflection circuits for controlling the deflection of the beam of a cathode ray tube;
   a direction control ring having a plurality of settable bistable elements with the outputs thereof connected to said plurality of inputs of said selection logic means;
   first means for indicating that said beam is in the curve area; and
   second means for indicating that said beam is outside said curve area, said first and second means being connected to said deflection selection logic whereby with any one bistable element of said direction control ring set, said beam will be deflected in one direction when outside said curve area and in another direction when in said curve area so as to tack along the edge of said curve heading in a direction corresponding to said any one bistable element.

2. The electronic curve follower of claim 1 wherein the number of bistable elements forming said control ring correspond to the directions north, northeast, east, southeast, south, southwest, west and northwest.

3. The electronic curve follower of claim 1 further comprising:
    means for progressively changing the setting of said bistable elements in correspondence with changes in heading of the curve to be followed.

4. The electronic curve follower of claim 3 wherein said means for progressively changing the setting of said bistable elements comprises:
    first time out means for providing an output indicative that the beam has remained outside the curve area beyond a predetermined time interval;
    second time out means for providing an output indicative that the beam has remained within the curve area beyond a predetermined time interval; and
    ring control logic means having inputs connected to certain outputs of said control ring and to the outputs of said first and second time out means and outputs connected to set said bistable devices whereby when the beam has remained outside said curve area beyond said predetermined time interval with one of said bistable elements set, the bistable element directionally adjacent to one side of said one bistable element becomes set and when the beam has remained within said curve area beyond said predetermined time interval, the bistable element directionally adjacent to the other side of said one bistable element becomes set.

5. An electronic curve follower comprising:
    deflection selection logic means having a plurality of inputs and outputs with the outputs connected to horizontal and vertical deflection circuits for controlling the deflection of the beam of a cathode ray tube;
    a direction control ring having a plurality of settable bistable elements with the outputs thereof connected to said plurality of inputs of said selection logic means;
    first means for indicating when said beam is in the curve area and connected to said selection logic;
    second means for indicating when said beam is outside said curve area and connected to said deflection logic;
    means for successively setting said bistable devices and operably connected to said first means whereby when said first means indicates that the beam is in the curve area the successive setting of said bistable devices is stopped; and
    means operable after the beam is in the curve area for progressively changing the setting of said bistable elements in correspondence with changes in heading of the curve to be followed.

6. The electronic curve follower of claim 5 wherein said direction control ring consists of a number of bistable latches corresponding to the directions north, northeast, east, southeast, south, southwest, west, and northwest.

7. An electronic curve follower comprising:
    a direction control ring having a plurality of settable bistable elements;
    deflection selection logic means having a plurality of inputs and outputs with the outputs connected to horizontal and vertical deflection circuits for controlling the deflection of the beam of a cathode ray tube;
    means connecting the outputs of said bistable elements to said inputs of said selection logic to partially place said selection logic under control of said control ring;
    means for monitoring the position of the beam relative to the curve being followed so as to develop one signal at one predetermined level when said beam is within said curve and another signal at another predetermined level when said beam is outside said curve; and
    means for connecting said monitoring means to said inputs of said deflection selection logic to provide further control thereover whereby with any one bistable element set, the beam will move in one predetermined direction when said monitoring means detects that the beam is within the curve and in another predetermined direction when the beam is detected by said monitoring means as being outside the curve so that the beam is caused to follow a curve heading in a direction corresponding to said any one bistable element.

8. The electronic curve follower of claim 7 further comprising:
    means for progressively changing the setting of said bistable elements according to changes in heading of the curve being followed.

9. The electronic curve follower of claim 8 wherein said means for progressively changing the setting of said bistable elements comprises:
    means for determining when said curve has changed direction; and
    direction ring control logic means having outputs connected to control the setting of said bistable elements of said direction ring and inputs operably connected to said determining means and said monitoring means to be controlled thereby.

References Cited

UNITED STATES PATENTS

| | | | |
|---|---|---|---|
| 2,980,332 | 4/1961 | Brouillette | 250—201 |
| 2,999,938 | 9/1961 | Hann | 250—202 |
| 3,050,581 | 8/1962 | Bomba | 250—202 |

ROBERT L. GRIFFIN, *Primary Examiner.*

J. A. ORSINO, JR., *Assistant Examiner.*

U.S. Cl. X.R.

250—201, 202, 217; 340—146.3